(12) United States Patent
Oda et al.

(10) Patent No.: US 8,040,542 B2
(45) Date of Patent: Oct. 18, 2011

(54) DISPLAY SYSTEM, INFORMATION DISTRIBUTING APPARATUS, ELECTRONIC DEVICE, AND PORTABLE TERMINAL

(75) Inventors: Ayumu Oda, Nara (JP); Atsushi Kurimoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 744 days.

(21) Appl. No.: 12/116,780

(22) Filed: May 7, 2008

(65) Prior Publication Data

US 2008/0278753 A1 Nov. 13, 2008

(30) Foreign Application Priority Data

May 10, 2007 (JP) .................................. 2007-125778

(51) Int. Cl.
*G06F 3/12* (2006.01)
*G06K 15/00* (2006.01)
*B41F 33/00* (2006.01)
*H04M 1/00* (2006.01)

(52) U.S. Cl. ..................... 358/1.14; 358/1.13; 358/1.15; 101/484; 455/550.1

(58) Field of Classification Search ................. 358/1.15, 358/1.14, 1.13, 404, 405, 406, 3.32; 101/484; 271/3.13
See application file for complete search history.

(56) References Cited

U.S. PATENT DOCUMENTS

| | | | |
|---|---|---|---|
| 5,781,708 A * | 7/1998 | Austin et al. ................... 358/1.6 |
| 6,353,899 B1 * | 3/2002 | Martin et al. .................... 714/57 |
| 6,487,375 B2 * | 11/2002 | Ferrer et al. ....................... 399/8 |
| 6,631,397 B1 * | 10/2003 | Satomi et al. ................. 709/203 |
| 6,950,613 B2 * | 9/2005 | Fujimoto et al. .................. 399/8 |
| 6,999,187 B2 * | 2/2006 | Tanaka .......................... 358/1.14 |
| 7,102,769 B2 * | 9/2006 | Cox ............................... 358/1.14 |
| 7,231,418 B2 * | 6/2007 | Satomi et al. ................. 709/203 |
| 7,239,979 B1 * | 7/2007 | McComber et al. .......... 702/185 |
| 7,295,882 B2 * | 11/2007 | Champion et al. .............. 700/94 |
| 7,355,730 B2 * | 4/2008 | Landau et al. ............... 358/1.14 |
| 7,355,731 B2 * | 4/2008 | Kidani et al. ................. 358/1.14 |
| 7,562,820 B2 * | 7/2009 | Muramatsu .................... 235/400 |
| 7,668,540 B2 * | 2/2010 | Silverbrook et al. ......... 455/418 |
| 7,692,809 B2 * | 4/2010 | McQuillan ................... 358/1.15 |
| 7,747,699 B2 * | 6/2010 | Prueitt et al. .................. 709/219 |
| 7,822,411 B2 * | 10/2010 | Nakatani ....................... 455/420 |
| 2003/0069921 A1 * | 4/2003 | Lamming et al. ............. 709/203 |

(Continued)

FOREIGN PATENT DOCUMENTS

JP 7-1790 A 1/1995

(Continued)

*Primary Examiner* — James A Thompson
*Assistant Examiner* — Jonathan Beckley
(74) *Attorney, Agent, or Firm* — Birch, Stewart, Kolasch & Birch, LLP

(57) ABSTRACT

A display system is provided that can perform suitable procedure display in accordance with the respective operation statuses of a plurality of electronic devices. The display system is formed by connecting an electronic device, a portable terminal, and an information distributing apparatus through a network, and the electronic device has a description tool affixed to the device to indicate the electronic device information of the device and transmits the state information of the device to the information distributing apparatus. The portable terminal acquires the electronic device information of the electronic device from the description tool and transmits it to the information distributing apparatus and displays the returned operation procedure information. The information distributing apparatus registers the received state information of the electronic device and returns the specified procedure display information to the portable terminal based on the electronic device information received from the portable terminal and the registered state information.

1 Claim, 21 Drawing Sheets

U.S. PATENT DOCUMENTS

| | | | |
|---|---|---|---|
| 2004/0153651 A1* | 8/2004 | Iida | 713/176 |
| 2004/0156063 A1* | 8/2004 | Vraa et al. | 358/1.12 |
| 2004/0160623 A1* | 8/2004 | Strittmatter et al. | 358/1.15 |
| 2004/0172586 A1* | 9/2004 | Ragnet et al. | 715/500 |
| 2005/0099653 A1* | 5/2005 | Kawaoka | 358/1.15 |
| 2006/0029399 A1* | 2/2006 | Park et al. | 399/12 |
| 2006/0256367 A1* | 11/2006 | Wei | 358/1.15 |
| 2007/0070400 A1* | 3/2007 | Matsumura | 358/1.15 |
| 2007/0139686 A1* | 6/2007 | Nishimi | 358/1.13 |
| 2007/0165265 A1* | 7/2007 | Ito et al. | 358/1.15 |
| 2008/0106762 A1* | 5/2008 | Mullender et al. | 358/1.16 |

FOREIGN PATENT DOCUMENTS

| | | |
|---|---|---|
| JP | 2004-226605 A | 8/2004 |
| JP | 2004-310192 A | 11/2004 |
| JP | 2006-017942 A | 1/2006 |
| JP | 2006-209594 A | 8/2006 |
| JP | 2007-041840 A | 2/2007 |
| JP | 2007-072851 A | 3/2007 |

* cited by examiner

PORTABLE TELEPHONE

STATE INFORMATION STORAGE PORTION

| APPARATUS ID | STATE 1 | STATE 2 | STATE 3 | ... |
|---|---|---|---|---|
| APPARATUS 1 | 01 (JAMMING 1) | 01 (JAMMING 2) | 01 (JAMMING 3) | |
| APPARATUS 2 | 02 (BLACK-TONER SHORTAGE) | 03 (INABILITY OF STAPLING) | | |
| ⋮ | ⋮ | ⋮ | ⋮ | ⋮ |

FIG. 10

PROCEDURE DISPLAY INFORMATION STORAGE PORTION

| MODEL INFORMATION | STATE | PROCEDURE DISPLAY INFORMATION (MOVING IMAGE DATA) |
|---|---|---|
| MODEL 1 | 01 (JAMMING) | MOVING IMAGE DATA SHOWING JAM RECOVERY PROCEDURE |
| MODEL 1 | 02 (TONER SHORTAGE) | MOVING IMAGE DATA SHOWING TONER SUPPLY PROCEDURE |
| MODEL 2 | 01 (JAMMING) | MOVING IMAGE DATA SHOWING JAM RECOVERY PROCEDURE |
| MODEL 2 | 02 (TONER SHORTAGE) | MOVING IMAGE DATA SHOWING TONER SUPPLY PROCEDURE |
| MODEL 3 | 01 (JAMMING) | MOVING IMAGE DATA SHOWING JAM RECOVERY PROCEDURE |
| MODEL 3 | 02 (TONER SHORTAGE) | MOVING IMAGE DATA SHOWING TONER SUPPLY PROCEDURE |

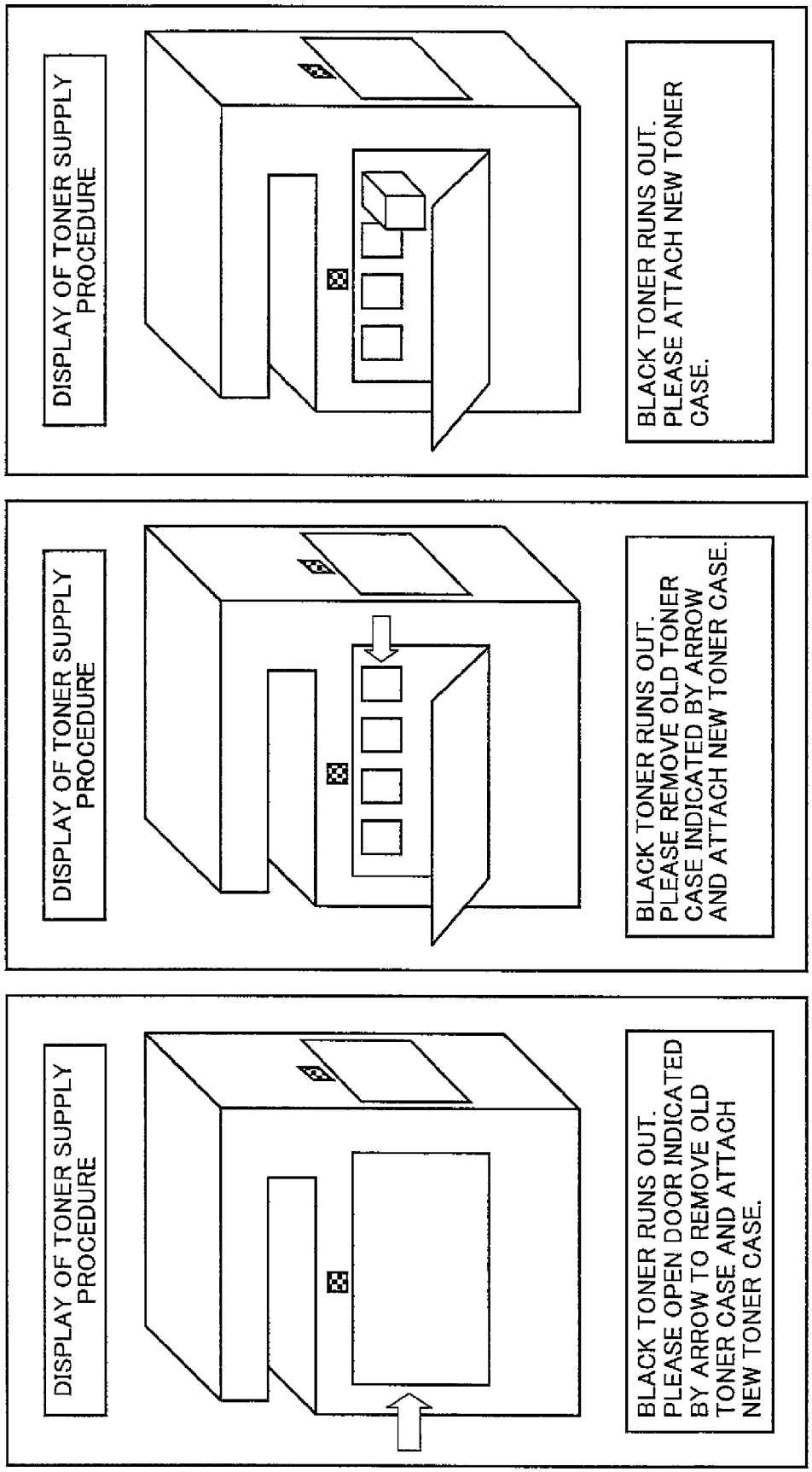

FIG. 17

| MODEL INFORMATION | STATE | OPERATING-PORTION CODE | PROCEDURE DISPLAY INFORMATION (MOVING IMAGE DATA) |
|---|---|---|---|
| MODEL 1 | 01 (JAMMING) | 0A(FRONT DOOR) | JAMMING DISPLAY 2 |
| MODEL 1 | 01 (JAMMING) | 0B(SIDE DOOR) | JAMMING DISPLAY 3 |
| MODEL 1 | 02(TONER SHORTAGE) | 0A(FRONT DOOR) | TONER-SHORTAGE DISPLAY 1 |
| MODEL 1 | 02(TONER SHORTAGE) | 0B(SIDE DOOR) | TONER-SHORTAGE DISPLAY 2 |
| MODEL 2 | 01 (JAMMING) | 0A(FRONT DOOR) | JAMMING DISPLAY 1 |
| MODEL 2 | 01 (JAMMING) | 0B(SIDE DOOR) | JAMMING DISPLAY 3 |
| MODEL 2 | 02(TONER SHORTAGE) | 0A(FRONT DOOR) | TONER-SHORTAGE DISPLAY 1 |
| MODEL 2 | 02(TONER SHORTAGE) | 0B(SIDE DOOR) | TONER-SHORTAGE DISPLAY 3 |

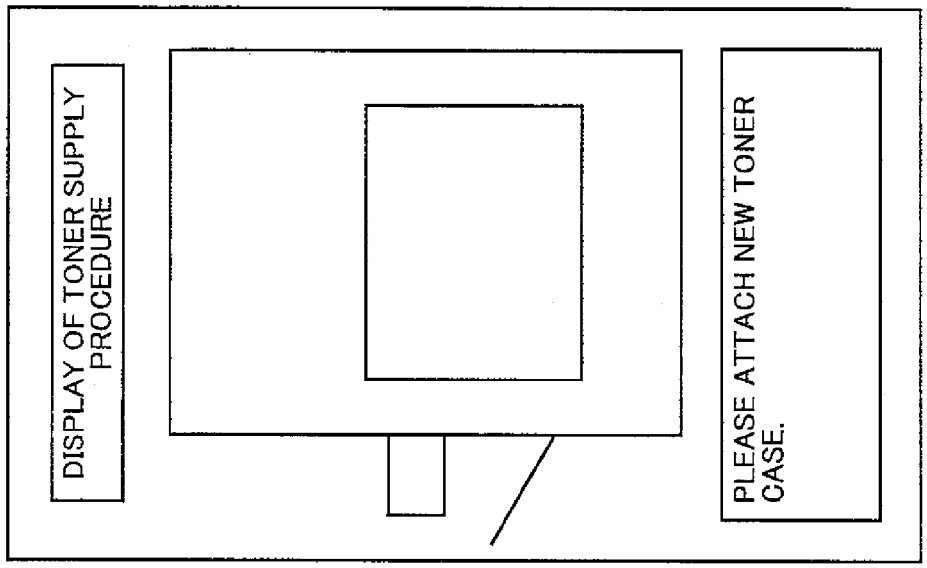
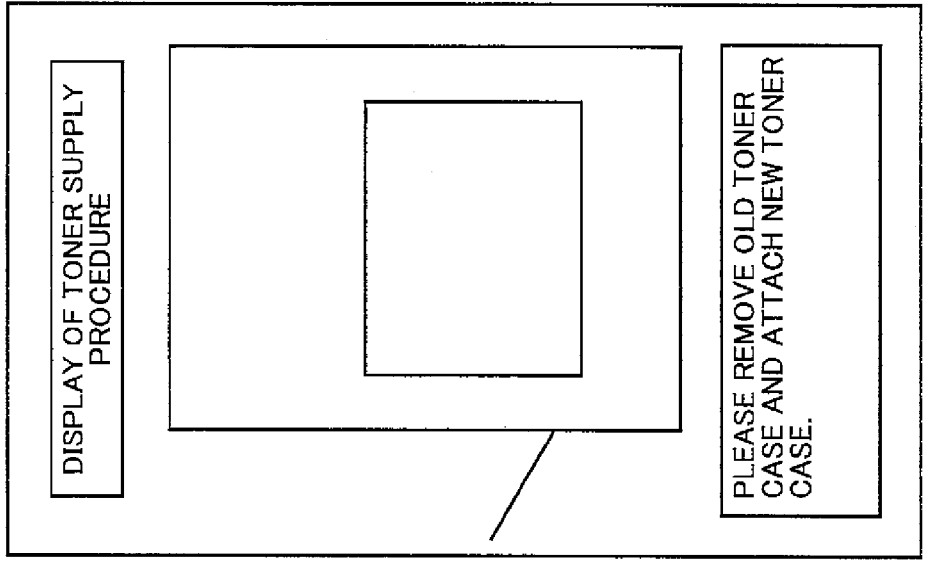
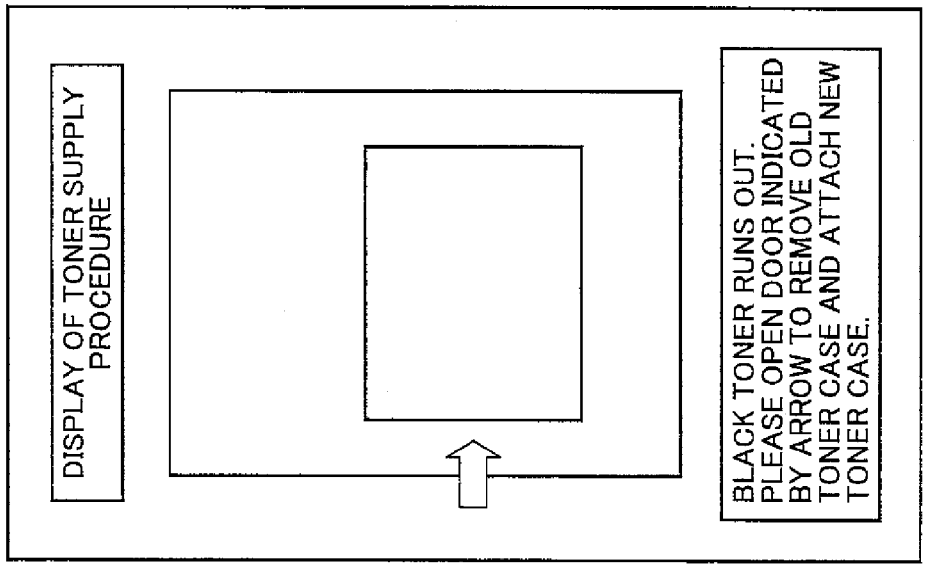

DISPLAY SYSTEM, INFORMATION DISTRIBUTING APPARATUS, ELECTRONIC DEVICE, AND PORTABLE TERMINAL

CROSS-NOTING PARAGRAPH

This Non-provisional application claims priority under 35 U.S.C. §119 (a) on Patent Application No. 2007-125778 filed in JAPAN on May 10, 2007, the entire contents of which are hereby incorporated herein by reference.

FIELD OF THE INVENTION

The present invention relates generally to a display system, an information distributing apparatus, an electronic device, and a portable terminal, and, more particularly, to a display system, an information distributing apparatus, an electronic device, and a portable terminal that display processing procedure at the time of error of an electronic device and the procedure of exchanging expendable supplies, etc.

BACKGROUND OF THE INVENTION

Conventionally, in electronic devices such as image forming devices, devices are known that display procedures corresponding to errors when detecting occurrence of error to facilitate error cancellation.

For example, Japanese Laid-Open Patent Publication No. 2006-17942 discloses a system that displays on a cellular phone a moving image related to a cancellation procedure for jam recovery of an image forming apparatus to facilitate the jam recovery. This system is configured such that a moving image suitable for the status of the image forming apparatus is selected and displayed.

However, a method has not been considered for easily identifying an electronic device in error condition which is in front of an operator from the plurality of electronic devices in an environment where a plurality of electronic devices is utilized, and selecting and transferring suitable procedure display to a portable terminal in accordance with the operation status of the identified electronic device.

SUMMARY OF THE INVENTION

It is the object of the present invention to provide a display system, an information distributing apparatus, an electronic device, and a portable terminal capable of performing suitable procedure display for a plurality of electronic devices in accordance with respective operation statuses.

To solve the above problem, the display system of the present invention has the following configuration.

The display system of the present invention is formed by connecting an electronic device, a portable terminal, and an information distributing apparatus described below through a network.

The portable terminal includes a description input portion that inputs electronic device information relating to the electronic device, a transmitting portion that transmits to the information distributing apparatus the electronic device information input through the description input portion to request operation procedure information of the electronic device, and a displaying portion that receives and displays the operation procedure information sent from the information distributing apparatus.

The electronic device includes a description tool affixed to the inside of the device to indicate electronic device information related to the device, and a transmitting portion that transmits state information of a state of the device to the information distributing apparatus.

The electronic device information may be represented by a bar-code or two-dimensional bar-code. If the electronic device information is a bar-code or two-dimensional bar-code, the description input portion is an input portion capable of reading an image of bar-code or two-dimensional bar-code.

The description tool may be affixed not only to the inside of the device but also to an internal part of the device. In this case, the description tool describes the information of the model (second electronic device information) of the electronic device that can equip with the internal part. The description input portion inputs the electronic device information related to the electronic device as well as the second electronic device information related to the electronic device that can equip with the internal part, and the transmitting portion transmits to the information distributing apparatus the electronic device information and the second electronic device information which are input through the description input portion and requests the operation procedure information of the electronic device.

The information distributing apparatus includes a state information registering portion that registers the state information received from the electronic device into a state information storage portion after having one to one correspondence between the information and the device; a procedure display information storage portion that stores, in correlation with an electronic device and the state of the electronic device, the procedure display information corresponding to the state; a retrieving portion that receives the electronic device information from the portable terminal, extracts the state information corresponding to the electronic device indicated by the electronic device information with reference to the state information storage portion, and retrieves the procedure display information corresponding to the electronic device information and the state information with reference to the procedure display information storage portion; and a procedure display information transmitting portion that returns the procedure display information retrieved by the retrieving portion to the portable terminal.

If the electronic device information and the second electronic device information are received from the portable terminal, the retrieving portion processes them as follows.

If the electronic device information received from the portable terminal has been registered in the state information storage portion, when the registered electronic device information is included in the received second electronic device information, the retrieving portion extracts the state information corresponding to the electronic device indicated by the electronic device information with reference to the state information storage portion and retrieves the procedure display information corresponding to the electronic device information and the state information with reference to the procedure display information storage portion.

If the electronic device information includes operating-portion information that differentiates operating portions of the electronic devices from each other, the procedure display information storage portion may have stored the procedure display information having correspondence with this operating-portion information, and the retrieving portion may extracts the procedure display information corresponding to the operating-portion information included in the electronic device information received from the portable terminal with reference to the procedure display information storage portion.

When the electronic device is an image forming apparatus, the procedure display information is the information indicating the jam recovery operation or the information indicating a procedure of exchanging expendable supplies. The procedure display information may be still image or moving image information.

BRIEF DESCRIPTION OF THE DRAWINGS

FIG. 10 depicts a data configuration example of a procedure display information storage portion of the first embodiment;

FIGS. 13A to 13C depict a display example of the toner supply procedure (moving image);

FIG. 17 depicts a data configuration example of a procedure display information storage portion of a second embodiment;

FIGS. 19A to 19C depict a display example of the toner supply procedure (moving image);

PREFERRED EMBODIMENTS OF THE INVENTION

Preferred embodiments according to a display system of the present invention will hereinafter be described with reference to the drawings.

First Embodiment

Figure 1:
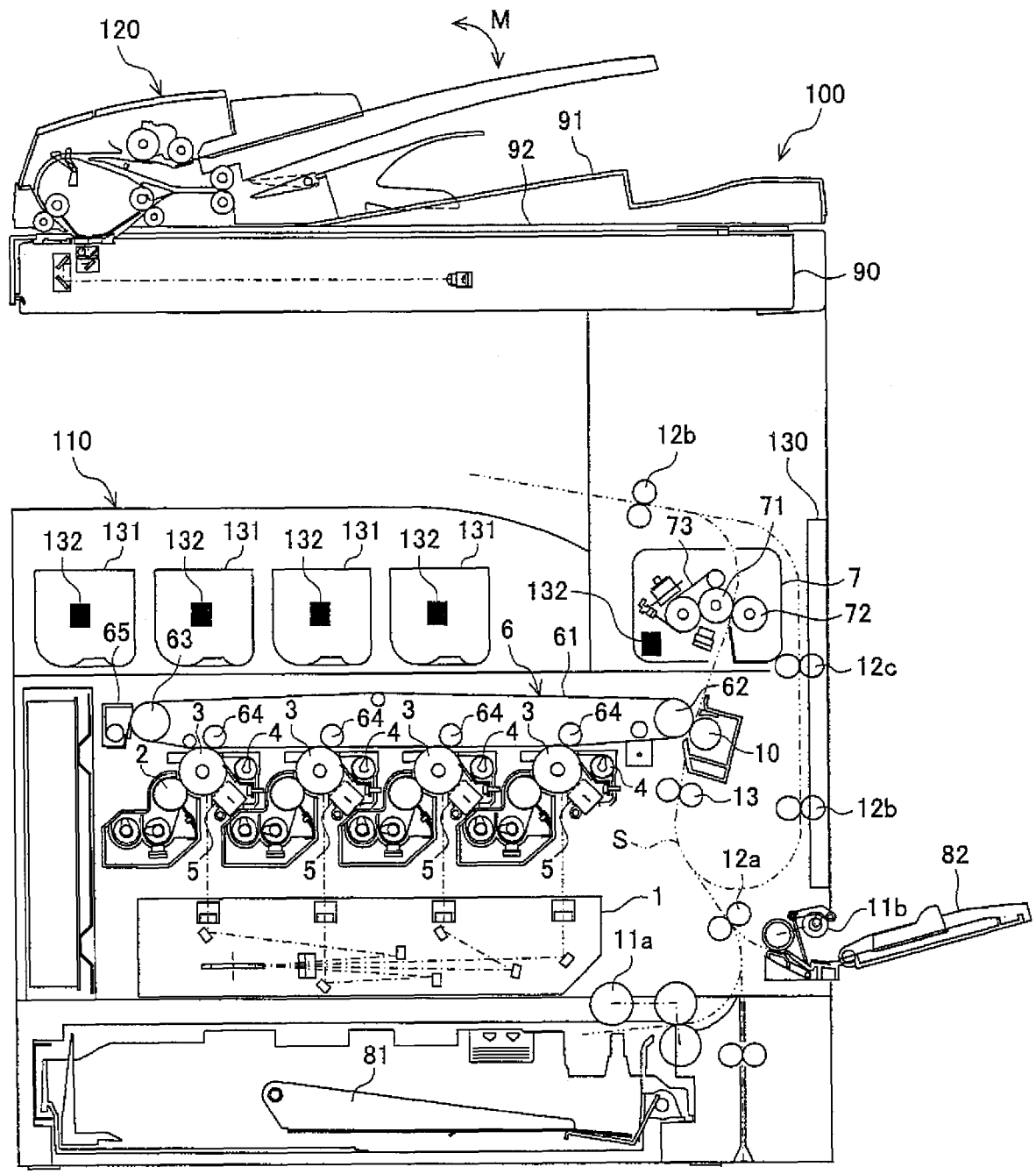
FIG. 1 is a view of an outline of an image forming apparatus showing an example of a target electronic device in a display system of the present invention.

FIG. 1 is a view of an outline of an image forming apparatus 100 showing an example of a target electronic device in a display system of the present invention. An electronic device of the present invention is not intended to be limited to an information forming apparatus and any device to which an operator must perform some operations depending on a state of an electronic device is applicable.

An image forming apparatus 100 forms a multicolor or monochrome image on a predetermined sheet (recording sheet) in accordance with image data transferred from the outside and is made up of an apparatus main body 110 and a document processing apparatus 120.

On the upper part of the apparatus main body 110, a document platform 92 made of clear glass is disposed for placing a document, and a document processing apparatus 120 is mounted on the upper side of the document platform 92. The document processing apparatus 120 automatically feeds a document onto the document platform 92. The document processing apparatus 120 is configured to be rotatable in directions of arrows M, and a document can be manually placed while the upper side of the document platform 92 is opened.

A document reading portion 90 located on the under side of the document platform 92 has a first scan unit, a second scan unit, an optical lens, and a CCD line sensor that is a photoelectric conversion device and relatively scans and reads an image of a document placed on the document platform 92 at a predetermined exposure position in operations associated with the document processing apparatus 120.

The image of the document read by the document reading portion 90 is sent as image data to a controlling portion through an image data input portion (not shown). In the controlling portion, the image data is temporarily stored in a memory after a predetermined image processing is given to it, and is output to an exposure unit 1 in accordance with the output instruction from the controlling portion.

The apparatus main body 110 includes the exposure unit 1, developing devices 2, photo-sensitive drums 3, cleaner units 4, electrifier 5, an intermediate transfer belt unit 6, a fixing unit 7, a paper feed cassette 81, a paper discharge tray 91, etc.

The image data handled in the image forming apparatus 100 correspond to a color image using colors of black (K), cyan (C), magenta (m), and yellow (Y). Therefore, four pieces are provided for the developing devices 2, the photo-sensitive drums 3, the electrifiers 5, and the cleaner units 4, respectively such that four latent images corresponding to the colors are formed and are respectively set to black, cyan, magenta, and yellow, thereby making up four image stations.

The electrifier 5 is an electrifying means for uniformly electrifying the surface of the photo-sensitive drums 3 to a predetermined electric potential and a contact type roller or brush charging device may be used in some cases instead of the charger type shown in FIG. 1.

The exposure unit 1 corresponds to an image writing apparatus and is configured as a laser scanning unit (LSU) including a laser emitting portion and reflective mirrors, etc. The exposure unit 1 is disposed with optical components such as polygon mirrors for scanning a laser beam, and lens and mirrors for leading the laser beam reflected by the polygon mirrors to the photo-sensitive drums 3. The configuration of an optical scanning apparatus making up the exposure unit 1 will specifically be described later.

For the exposure unit 1, another technique can be employed that uses, for example, an EL (electroluminescence) or LED (light emitting diode) write head having light emitting elements arranged in an array.

The exposure unit 1 has a function of forming an electrostatic latent image in accordance with the image data on the surface of the charged photo-sensitive drums 3 by exposing the charged drum according to the input image data.

The developer 2 develops the electrostatic latent image formed on each of the photo-sensitive drums 3 using toners of four colors (YMCK).

The cleaner unit 4 removes and collects the toner remaining on the surface of each photo-sensitive drum 3 after the development and the image transfer.

The intermediate transferring belt unit 6 disposed above the photo-sensitive drum 3 includes an intermediate transferring belt 61, an intermediate transferring belt driving roller 62, an intermediate transferring belt driven roller 63, an intermediate transferring roller 64, and an intermediate transferring belt cleaning unit 65. Four intermediate transferring rollers 64 are provided respectively corresponding to the colors of YMCK.

The intermediate transferring belt driving roller 62, the intermediate transferring belt driven roller 63, and the intermediate transferring roller drives the intermediate transferring belt 61 to rotate by laying the belt in a tensioned state around them. Each intermediate transferring roller 64 provides a transfer bias to transfer the toner image on the photo-sensitive drum 3 onto the intermediate transferring belt 61.

The intermediate transferring belt 61 is provided such that the intermediate transferring belt 61 can be in contact with each photo-sensitive drum 3, and the intermediate transferring belt 61 has a function of forming a color toner image (multi-color toner image) on the intermediate transferring belt 61 by transferring each of the toner images of respective colors formed on the photo-sensitive drums 3 onto the intermediate transferring belt 61 one on the top of another. The intermediate transferring belt 61 is formed in an endless shape using, for example, a film having a thickness of about 100 to 150 μm.

The transfer of the toner image from the photosensitive drum 3 to the intermediate transferring belt 61 is executed by the intermediate transferring roller 64 that is in contact with the under surface of the intermediate transferring belt 61. The intermediate transferring roller 64 is applied with a transfer bias of a high voltage (a high voltage of the polarity (+) opposite to the polarity (−) of the charged toner) to transfer the charged toner image.

The intermediate transferring roller 64 is a roller which is composed of a metal shaft formed (for example, stainless steel) with a diameter of 8 to 10 mm covered with an electro-conductive elastic material (for example, EPDM or urethane foam). Due to this electro-conductive elastic material, a high voltage can be uniformly applied to the intermediate transferring belt 61. In the embodiment, though a roller-like shape is employed as the shape of a transferring electrode, a brush-like shape may also be used.

As described above, each electrostatic latent image that has been developed as an image corresponding to each color tone on each photo-sensitive drum 3 is accumulated on the intermediate transferring belt 61. In this manner, the accumulated image information is transferred onto a paper sheet according to the rotation of the intermediate transferring belt 61 using a transferring roller 10 that is disposed at the position where the paper sheet comes into contact with the intermediate transferring belt 61.

At this time, the intermediate transferring belt 61 and the transferring roller 10 are pressed into contact with a predetermined nip and the transferring roller 10 is applied with a voltage to transfer the toner onto the paper sheet (a high voltage having the polarity (+) opposite to the polarity (−) of the charged toner). In order to constantly obtain the above nip to the transferring roller 10, either of the transferring roller 10 or the intermediate transferring belt driving roller 62 is made of a hard material (such as a metal) and the other is made of a soft material such as an elastic roller (an elastic rubber roller or a resin foam roller, etc.).

Toner attached to the intermediate transferring belt 61 that is caused by the contact between the belt and the photo-sensitive drum 3, as described above, or toner remained on the intermediate transferring belt 61 without being transferred onto the paper sheet by the transferring roller 10, causes to mix up colors at the next process. Therefore, the apparatus is designed to remove and collect such toner using the intermediate transferring belt cleaning unit 65. The intermediate transferring belt cleaning unit 65 includes, for example, a cleaning blade as a cleaning member that comes into contact with the intermediate transferring belt 61, and the intermediate transferring belt 61 with which that the cleaning blade comes into contact is supported by the intermediate transferring belt driven roller 63 from the under surface thereof.

The paper feed cassette 81 is a tray for storing recording paper sheets used for forming images and is provided on the under side of the exposure unit 1 in the apparatus main body 110. The recording paper sheets used for forming images can also be placed on a manual paper feed cassette 82. The paper discharge tray 91 provided on the upper side of the apparatus main body 110 is a tray for accumulating the printed recording paper sheets face-down.

The apparatus main body 110 is also provided with a paper sheet transporting path S having an approximately upright shape for sending the recording paper sheets in the paper feeding cassette 81 and the manual-insertion paper feeding cassette 82 to the discharged paper tray 91 by way of the transferring roller 10 and the fixing unit 7. In the vicinity of the paper sheet transporting path S between the paper feeding cassette 81 or the manual-insertion paper feeding cassette 82 and the discharged paper tray 91, picking-up rollers 11a and 11b, a plurality of transporting roller 12a to 12d, a registration roller 13, the transferring roller 10 and the fixing unit 7, etc., are disposed.

The transporting rollers 12a to 12b are small rollers to facilitate and aid the transportation of the recording paper sheets and the plurality thereof is provided along the paper sheet transporting path S. The picking-up roller 11a is disposed in the vicinity of the end of the paper feeding cassette 81, and picks up the recording paper sheets one by one from the paper feeding cassette 81 and supplies the recording paper sheets to the paper sheet transporting path S. Similarly, the picking-up roller 11b is disposed in the vicinity of the end of the manual-insertion paper feeding cassette 82, and picks up the recording paper sheets one by one from the manual-insertion paper feeding cassette 82 and supplies the recording paper sheets to the paper sheet transporting path S.

The registration roller 13 temporarily retains the recording paper sheet that is being transported in the paper sheet transporting path S, and has a function of transporting the recording paper sheet to the transferring roller 10 at the timing to adjust the top edge of the toner image on the photo-sensitive drum 3 to the top edge of the recording paper sheet.

The fixing unit 7 includes a heating roller 71 and a pressure roller 72. The heating roller 71 and the pressure roller 72 are arranged to rotate with the recording paper sheet sandwiched in between. The heating roller 71 is designed to have a predetermined fixing temperature by a controlling portion based on a signal from a temperature detector (not shown). The heating roller 71 has a function of melting, mixing, and pressing a multi-color toner image that has been transferred onto the recording paper sheet and thermally-fixing this image onto the recording paper sheet by thermally compressing the toner onto the recording paper sheet together with the pressure roller 72. An external heating belt 73 to externally heat the heating roller 71 is provided.

The recording paper sheet transporting path will be described in detail. As described above, the image forming apparatus is provided with the paper feeding cassette 81 that stores the recording paper sheets in advance and the manual-insertion paper feeding cassette 82. To feed the paper sheets from these paper feeding cassettes 81 and 82, the picking-up rollers 11a and 11b are disposed in the cassettes 81 and, 82, respectively and each of the rollers guides the recording paper sheets one by one to the transporting path S.

The recording paper sheet transported from each of the paper feeding cassettes 81 and 82 is transported by the transporting roller 12a of the paper sheet transporting path S to the registration roller 13 and is transported to the transferring roller 10 at the timing to adjust the top edge of the recording paper sheet to the top edge of the image information on the intermediate transferring belt 61, and the image information is written onto the recording paper sheet. Thereafter, the recording paper sheet passes through the fixing unit 7 and, thereby, the unfixed toner on the recording paper sheet is thermally melted and fixed. The recording paper sheet passes through the transporting roller 12b disposed thereafter and is discharged onto the discharged paper tray 91.

The above transporting path is the one for a request of single-side printing. On the other hand, for double-side printing, the recording paper sheet is guided to the transporting rollers 12c and 12d by the transporting roller 12b which rotates reversely when the rear end of the recording paper sheet to which single-side printing has been finished as described above and has passed through the fixing unit 7 is held by the last transporting roller 12b. Thereafter, the recording paper sheet passes through the registration roller 13 and printing is executed on the back side of the recording paper sheet and the recording paper sheet is discharged into the discharged paper tray 91.

A side door 130 is provided such that a sheet feeding path can be opened for a sheet removal processing at the time of paper jam and is rotatably supported by a shaft at the lower end. A toner case 131 stores toner and supplies the toner to the developing devices 2 of each color.

Figure 2:
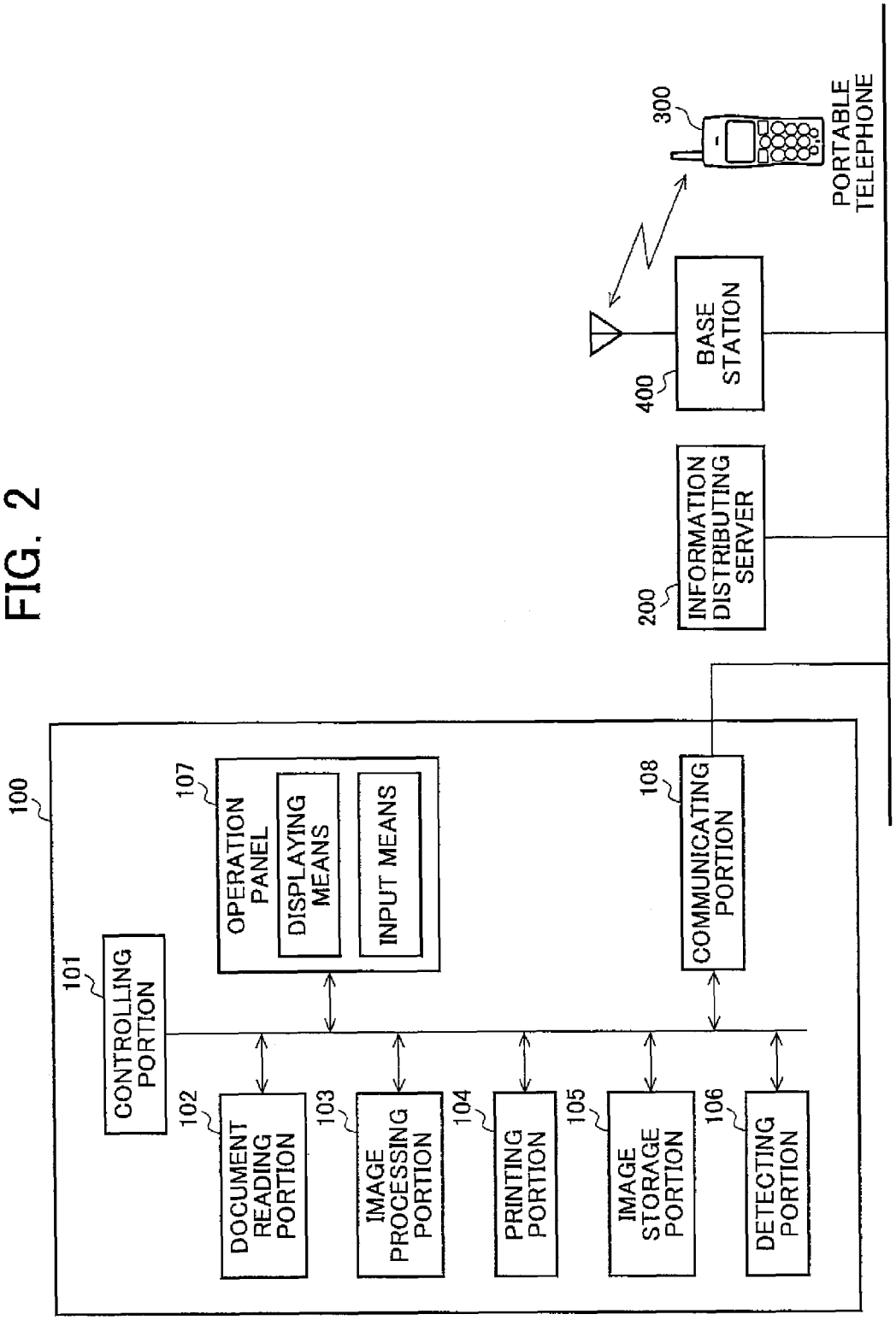
FIG. 2 is a view of an overall configuration of the display system according to the present invention.

FIG. 2 is a view of an overall configuration of the display system according to the present invention. In FIG. 1, the display system includes the image forming apparatus 100 that is an example of the electronic device, a camera-equipped portable telephone 300 that is an example of the portable terminal, an information distributing server 200, and a base station 400 of the portable telephone 300. Pluralities of image forming apparatuses 100 and the camera-equipped portable telephones 300 may be included.

In FIG. 2, the image forming apparatus 100 at least includes a controlling portion 101, a document reading portion 102, an image processing portion 103, a printing portion 104, an image storage portion 105, a detecting portion 106, an operation panel 107, and a communicating portion 108.

The controlling portion 101 consists of a main CPU (central processing unit), a ROM (read only memory), a RAM (random access memory), and an HDD (hard disc drive) and generally controls input/output devices in accordance with programs preliminarily written in the ROM to temporarily store the data which is input/output during this period in a predetermined memory area of the RAM.

The document reading portion 102 causes the light emitted from a light source lamp to reflect from a document, converts the reflected light into electric information with a photoelectric conversion device such as ccd and cis, and outputs the electric information to the image processing portion 103 as the image data.

The image processing portion 103 executes image processing such as density conversion and color conversion to convert the image data which is output from the document reading portion 102 into the data suitable for print output and outputs the data to the printing portion 104.

The printing portion 104 transfers a toner image onto a recording paper sheet based on the image data which is output from the image processing portion 103 and performs the print output.

The image storage portion 105 is a memory that stores the image data processed by the image processing portion 103.

The detecting portion 106 includes various sensors detecting an apparatus state of the image forming apparatus 100 and outputs the information detected by the sensors to the controlling portion 101. For example, a paper jam is detected by sheet sensors provided at some points on the recording paper sheet feeding path based on the output indicating that no sheet exists; the presence of recording paper sheet is detected by a sensor provided on the paper feed cassette; whether toner shortage is resolved is detected based on the output of a toner density sensor; and it is detected whether various expendable supplies are used after a predetermined period has expired.

The operation panel 107 includes an input means such as input keys and switches and a displaying means that is a liquid crystal panel to display an apparatus state, available sheet size, copying magnification, etc., and can accept operator's operations through the input means. The displaying means may be a liquid crystal touch panel where input can be performed by touching a liquid crystal screen.

The communicating portion 108 is an interface for making connection with a network such as a LAN (local area network) through a NIC (network interface card), etc. The communicating portion 108 is connected through a network to the information distributing server (information distributing apparatus) 200 for the communication with the image forming apparatuses 100.

The information distributing server (information distributing apparatus) 200 is made up of a normal computer including a CPU (central processing unit) and other peripherals and is communicatably connected through the network to the image forming apparatuses 100 and the base station 400. The information distributing server 200 is communicatably connected through the base station 400 to the portable telephone 300.

The information distributing server 200 transmits/receives to/from the image forming apparatuses 100 the state information of the apparatus 100 and receives/transmits from/to the portable telephone 300 a request for procedure display information from the device 300 and the procedure display information to the device 300 by e-mails, etc.

The portable telephone (portable terminal) 300 can communicate with the base station 400 and is a device that sends a request for operation procedure information of the image forming apparatuses 100 to the information distributing server 200 and that receives and displays the procedure display information sent from the information distributing server 200 by e-mails, for example.

Figure 3:
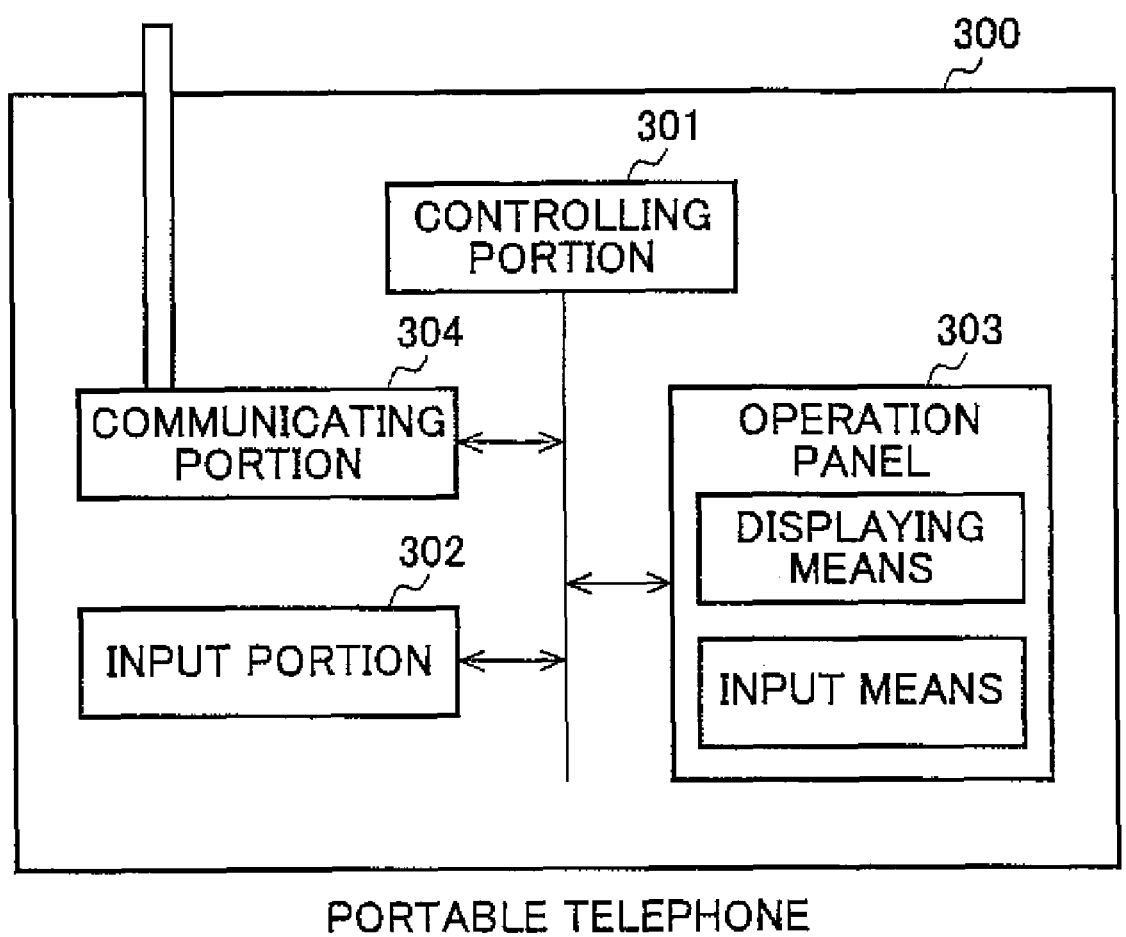
FIG. 3 is a block diagram of a configuration of a portable telephone.

The portable telephone 300 communicates with the base station 400 through a portable telephone network and can be connected to the network through the base station 400. The portable telephone 300, like an ordinary cell phone, includes a controlling portion (made up of a CPU and memories such as ROM and RAM) 301, a communicating portion 304, an input portion including a camera function, an operation panel 303 including an input means such as input keys and switches and a displaying means of a liquid crystal panel, a speaker and a microphone (not shown), etc., (FIG. 3).

The portable telephone 300 is assumed to include a function of shooting and converting a bar-code (two-dimensional bar-code, QR code), etc., printed on a description tool affixed to the image forming apparatuses 100 into code information represented by the shot image.

The portable telephone 300 may be a PHS (personal Handyphone system), a PDA (personal data assistance), and a handheld personal computer, etc., which are capable of including the camera function and the network communication function.

Figure 4:
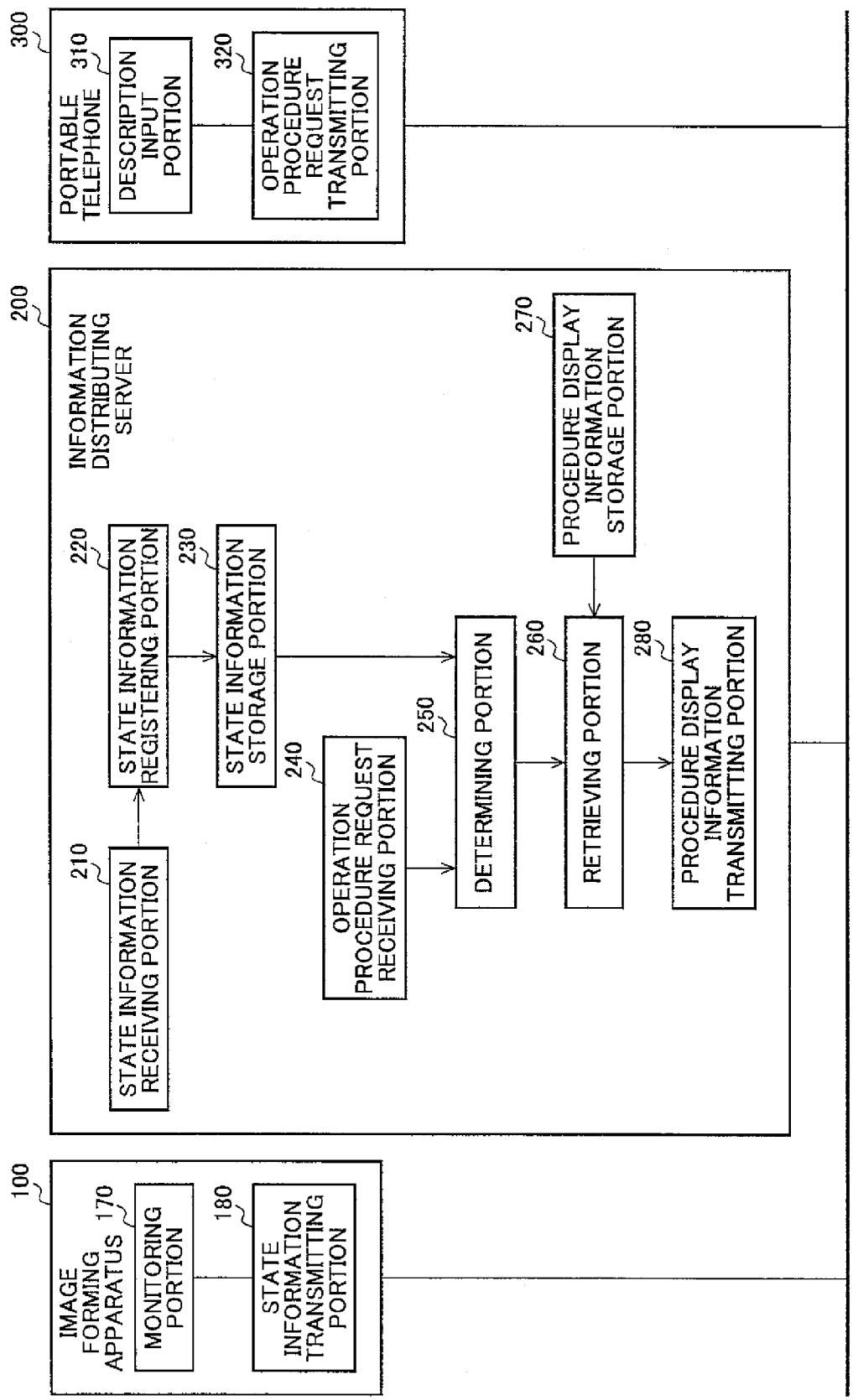
FIG. 4 is a block diagram of functional configurations included in an information distributing server, an image forming apparatus, and a portable telephone of the display system according to a first embodiment of the present invention.

The functional configurations of the information distributing server 200, the image forming apparatuses 100, and the portable telephone 300 of the display system according to a first embodiment will then be described with reference to a block diagram of FIG. 4.

Each of a plurality of the image forming apparatuses 100 includes the above configuration and function and further includes a monitoring portion 170 and a state information transmitting portion 180.

The monitoring portion 170 operates as a part of the controlling portion 101, causes the detecting portion 106 to operate for a certain period with a timer to acquire the state information of the apparatus 100, and executes an interruption processing to for the communicating portion 108 to deliver the state information of the apparatus 100.

The monitoring portion 170 is interrupted because of a change in the state information of the apparatus 100 and executes an interruption process to the state information transmitting portion 180 to deliver the state information of the apparatus 100.

The above described state information consists of codes indicating jamming error, toner shortage, expiration of a predetermined period of expendable supplies, etc., that require operator's operations and the fact that these states are removed, and positions where these states occur or types of these states.

For example, the state information is a code indicating a jamming error and a position where the jamming occurs in the case of the jamming and is a code indicating the toner shortage and a color type of the depleted toner in the case of the toner shortage.

Since these states, for example, the jamming can concurrently occur at a plurality of locations, all the occurring states are transmitted to the information distributing server 200.

When interrupted by the monitoring portion 170, the state information transmitting portion 180 acquires an apparatus ID (electronic device information) of the apparatus 100 stored in the ROM, etc., and transmits the apparatus ID through the communicating portion 108 to the address of the information distributing server 200 stored in the ROM, etc., along with the state information of the apparatus 100 delivered from the monitoring portion 170.

The apparatus ID consists of model information indicating a model of the apparatus 100 and a serial number of the image forming apparatus.

Figure 5:
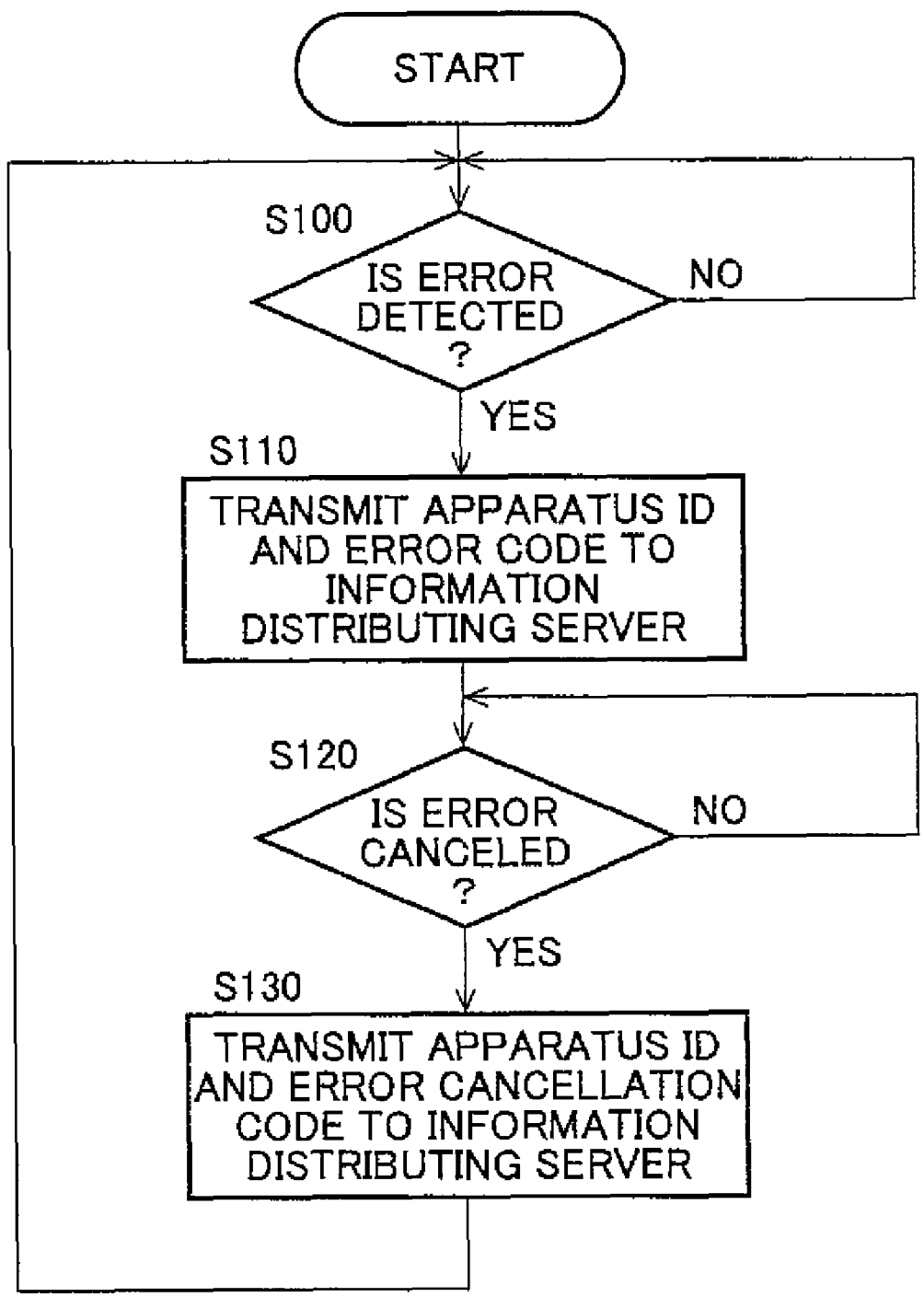
FIG. 5 is a flowchart of a processing procedure of the image forming apparatus of the first embodiment.

The processing procedure of the image forming apparatus 100 will then be described with reference to a flowchart of FIG. 5.

When detecting an error such as jamming and toner shortage (step S100/Yes), the monitoring portion 170 of the image forming apparatus 100 transmits the error-code state information indicating a type of the error and the apparatus ID specifying the image forming apparatus 100 having the error to the information distributing server 200 using the state information transmitting portion 180 (step S110). The apparatus ID consists of model information indicating the model and the serial number of the image forming apparatus.

When the operator watches a moving image or a still image that is the procedure display information for the error handling procedure displayed on the displaying means of the operation panel of the portable telephone 300 and cancels the error, the monitoring portion 170 of the image forming apparatus 100 detects whether the error cancellation operation is performed (step S120/YES), transmits the cancellation-code sate information indicating the type of error cancellation and the apparatus ID specifying the image forming apparatus 100 with the error cancelled to the information distributing server 200 using the state information transmitting portion 180 (step S130), and recovers to the normal state (step S100).

Each of a plurality of the portable telephones 300 includes the configuration and functions of an ordinary cell phone and further includes a description input portion 310 and an operation procedure request transmitting portion 320.

The description input portion 310 inputs through an input portion (camera) 302 the description tool (e.g., a bar-code (two-dimensional bar-code, QR code)) affixed to the image forming apparatuses 100, performs conversion into the code information represented by the description tool, and activates the operation procedure request transmitting portion 320 to deliver the converted code information. For example, a bar-code (two-dimensional bar-code, QR code, etc.) representing the apparatus ID (model, serial number) is printed on the description tool affixed to the image forming apparatuses 100.

Figure 6:
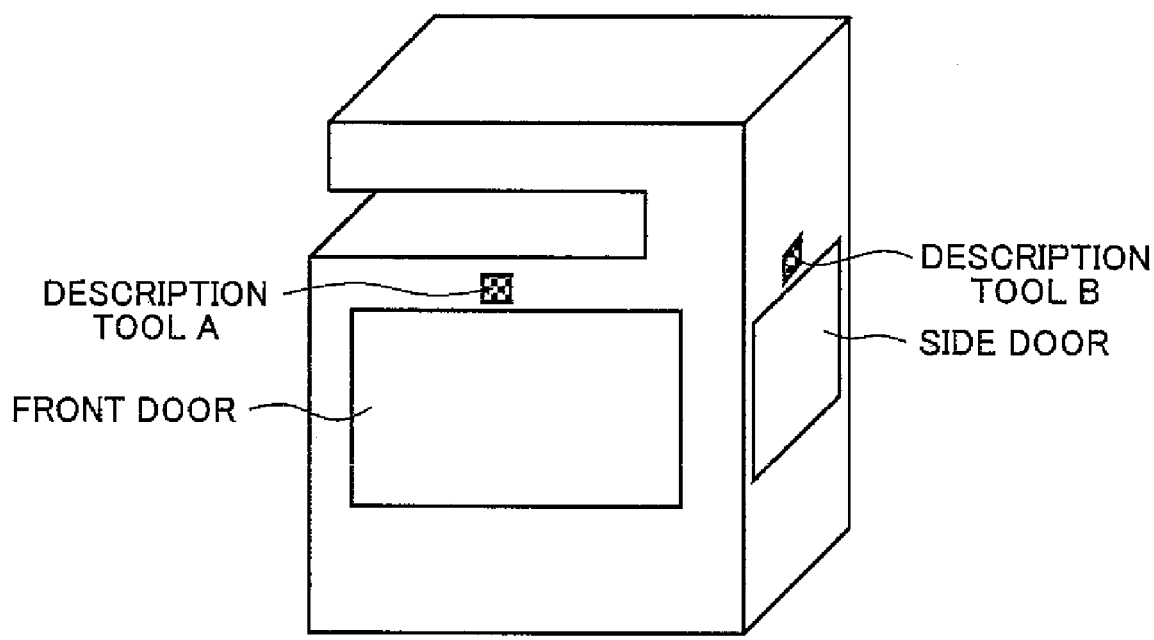
FIG. 6 depicts an example of an exterior appearance of an image forming apparatus with description tools affixed.

FIG. 6 depicts an example of the exterior appearance of the image forming apparatus 100. A front door is provided on the front face of the main body for accessing the inside of the apparatus and a description tool A is affixed near the door. A side door is provided on the right side of the main body for accessing the inside of the apparatus and a description tool B is affixed near the door. In this embodiment, two-dimensional bar-codes (QR codes) are used for these description tools.

Figure 7A:
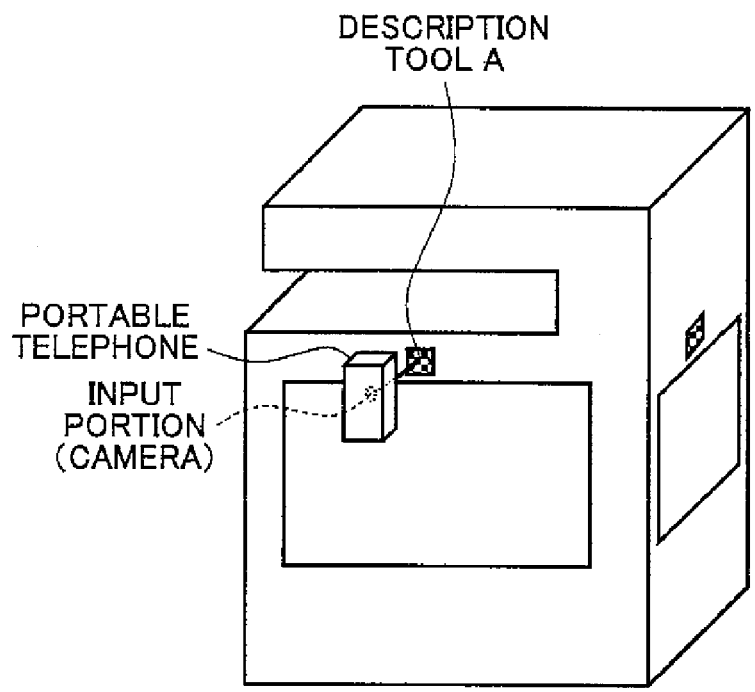
FIGS. 7A and 7B depict examples of situations when the description tools affixed to the image forming apparatus are shot by an input portion of the portable telephone.
Figure 7B:
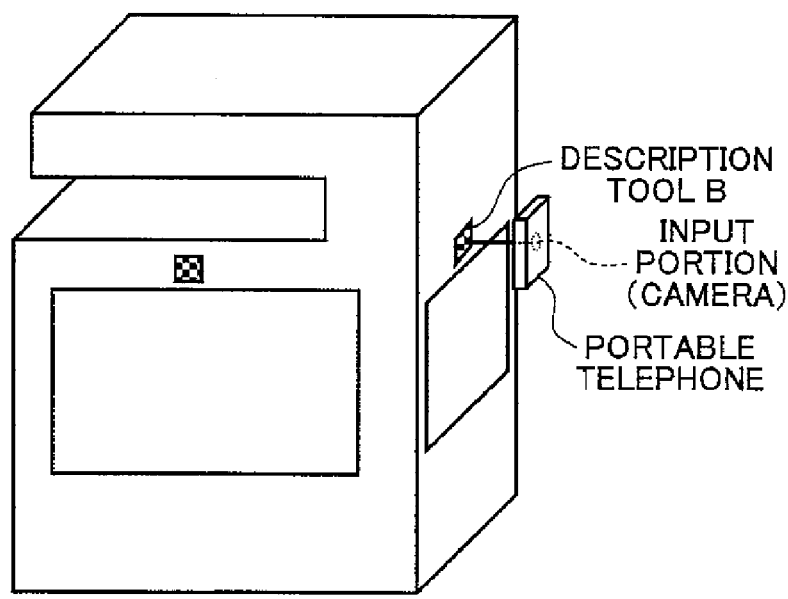

As shown in FIGS. 7A and 7B, the description input portion 310 converts the image of the two-dimensional bar-code (QR code) shot with the input portion 302 of the portable telephone 300 brought closer to the image. In FIG. 7A, the two-dimensional bar-code (QR code) is affixed to the door on the front face of the main body, and in FIG. 7B, the two-dimensional bar-code (QR code) is affixed to the door on the side face of the main body.

The operation procedure request transmitting portion 320 acquires a portable telephone ID (e.g., e-mail address of the portable telephone) specifying the portable telephone stored in the ROM, etc., and transmits the ID to the address of the information distributing server 200 stored in the ROM, etc., through the communicating portion 304 along with the apparatus ID delivered from the description input portion 310.

By performing a predetermined operation to the procedure display information sent from the information distributing server 200, the portable telephone 300 can display a moving image or still image that is the procedure display information of the requested operation procedure on the displaying means of the operation panel.

In the first embodiment, assuming that the procedure display information is sent by being attached to by an e-mail, the procedure display information attached to the e-mail can be displayed when an operator performs a predetermined operation to the received e-mail.

Figures 8, 9:
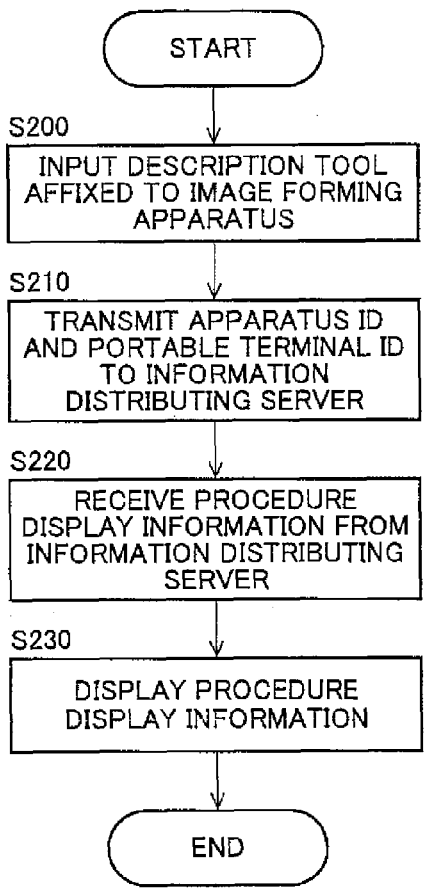
FIG. 8 is a flowchart of a processing procedure of the portable telephone of the first embodiment.
FIG. 9 depicts a data configuration example of a state information storage portion of the first embodiment.

The processing procedure of the portable telephone 300 will then be described with reference to a flowchart of FIG. 8.

If a state change such as an error occurs in the image forming apparatus, an operator shoots the description tool (bar-code (such as two-dimensional bar-code, QR code, etc.)) affixed to the image forming apparatuses having an error with the input portion (camera) of the portable telephone 300, and then, the description input portion 310 converts the shot image of the description tool into the apparatus ID represented by the description tool (step S200).

The operation procedure request transmitting portion 320 of the portable telephone 300 acquires the portable terminal ID (e.g., e-mail address of the portable telephone) specifying the portable telephone and transmits the ID to the information distributing server 200 along with the apparatus ID converted by the description input portion 310 (step S210).

The operator receives the e-mail sent from the information distributing server 200 to acquire the procedure display information (step S220) and performs a predetermined operation to the portable telephone to display the procedure display information (moving image or still image) of the requested operation procedure on the displaying means of the operation panel (step S230).

The information distributing server 200 includes a state information receiving portion 210, a state information registering portion 220, a state information storage portion 230, an operation procedure request receiving portion 240, a determining portion 250, a retrieving portion 260, a procedure display information storage portion 270, and a procedure display information transmitting portion 280.

The state information receiving portion 210 activates the state information registering portion 220 to deliver thereto the apparatus ID and the state information of the image forming apparatus 100 received through the network from any one of the image forming apparatuses 100.

The state information registering portion 220 registers the apparatus ID and the state information delivered from the state information receiving portion 210, by putting one to one correspondence between them, in the state information storage portion 230. As shown in FIG. 9, the state information storage portion 230 stores the apparatus ID and the state information by putting one to one correspondence between them.

If the same apparatus ID has already been registered, only the state information not registered is additionally registered.

If the received state information includes a code indicating recovery to the normal state, the same information as the received information is deleted from the state information corresponding to the apparatus ID. If the state information corresponding to the apparatus ID completely runs out, the registration of the apparatus ID is erased from the state information storage portion 230.

For example, for the state information of an apparatus ID "apparatus 1", three jamming-error codes are registered since jamming occurred at different locations. When the jamming is removed, any one of the three jamming-error codes is deleted in accordance with the location of the removal, and when the jamming is completely removed, the apparatus ID "apparatus 1" itself is erased from the state information storage portion 230.

For the state information of an apparatus ID "apparatus 2", error codes are registered for the toner shortage and the inability of stapling.

When receiving an operation procedure request (the image forming apparatus ID and the portable telephone ID) from any one of the portable telephones 300 through the network, the operation procedure request receiving portion 240 activates the determining portion 250 to deliver thereto the received portable telephone ID and apparatus ID of the image forming apparatus 100.

The determining portion 250, on referring to the state information storage portion 230, searches for the same apparatus ID as the delivered apparatus ID. If the same apparatus ID exists, the retrieving portion 260 is activated, and the model information of the apparatus ID, the state information corresponding to the apparatus IDs, and the portable terminal ID are delivered thereto. If the same apparatus ID is not registered in the state information storage portion 230, an e-mail is transmitted to the portable terminal ID that indicates "no situation requiring operations occurs in the specified image forming apparatus".

The retrieving portion 260, on referring to the procedure display information storage portion 270, retrieves the procedure display information corresponding to the delivered model information and state information.

In the retrieval procedure, first, the model information of the procedure display information storage portion 270 is searched that is identical to the delivered model information, and all pieces of the procedure display information corresponding to the identical model information are extracted.

The procedure display information agrees with the delivered state information is then extracted from the procedure display information already extracted.

The procedure display information transmitting portion 280 is activated and all the pieces of the extracted procedure display information and the portable terminal ID are delivered thereto.

The procedure display information transmitting portion 280 attaches all the delivered pieces of the procedure display information to an e-mail and transmits the e-mail to the delivered portable terminal ID.

As shown in FIG. 10, the procedure display information storage portion 270 stores the procedure display information (still image or moving image data) having correspondence to the combinations of the model information and the state information. In FIG. 10, the procedure display information (moving image data) corresponding to two states is registered for each model. For example, the model information "model 1" has "01 (jamming)" and "02 (toner shortage)"; "moving image data showing jamming recovery" is stored for "01 (jamming)"; and "moving image data showing toner supply procedure" is stored for "02 (toner shortage)".

The procedure display information will then be described with reference to FIG. 10.

Figure 11:
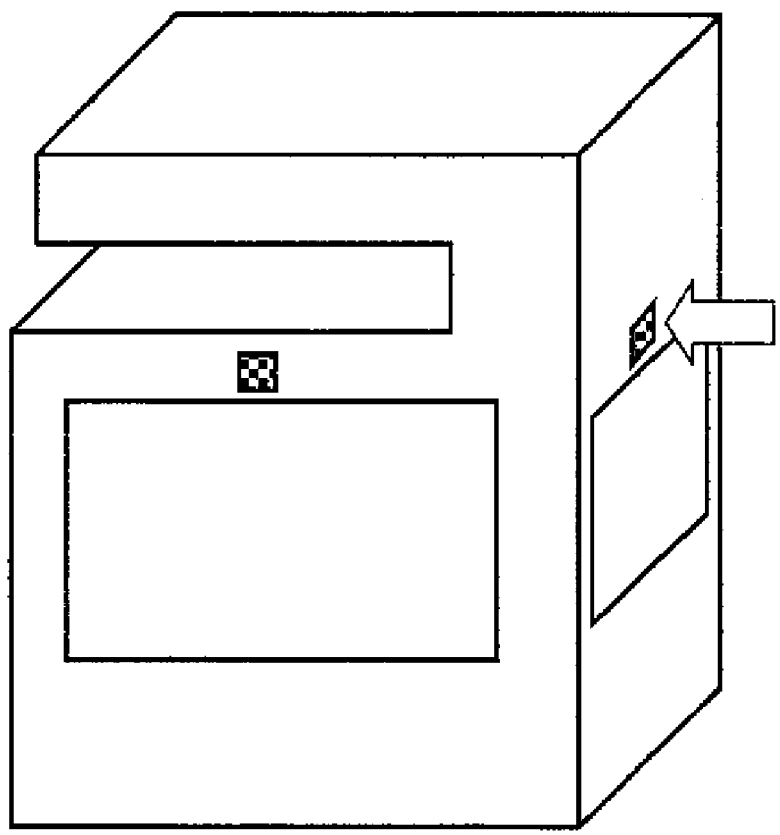
FIG. 11 depicts a display example of the paper-jam (jam) recovery procedure (still image)

FIG. 11 depicts the case that the procedure display information is created using still image date when the state is "01 (jamming)". After shooting the description tool A (FIG. 7A) at the time of jamming, the procedure display is displayed on the displaying means of the portable telephone to "prompt an operator to go around to the side of the main body and look at the side door".

Figure 12C:
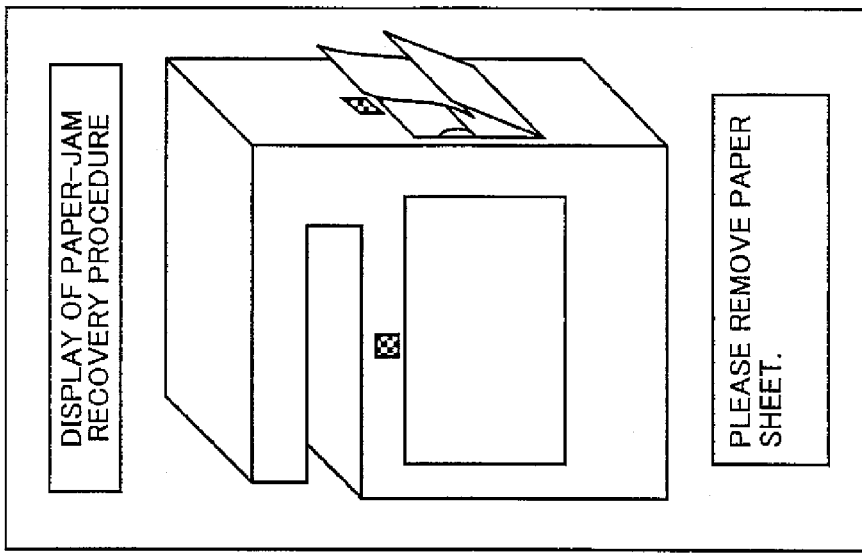
FIGS. 12A to 12C depict a display example of the paper-jam (jam) recovery procedure (moving image)
Figure 12B:
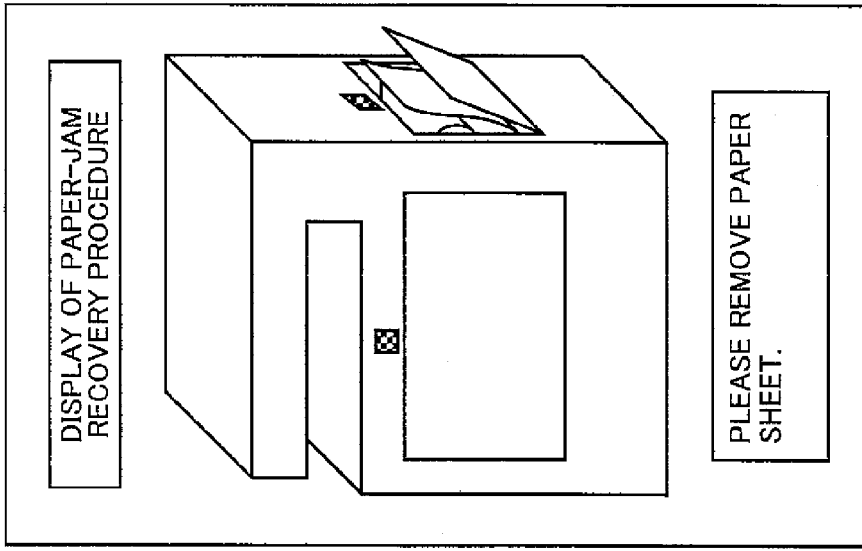
Figure 12A:
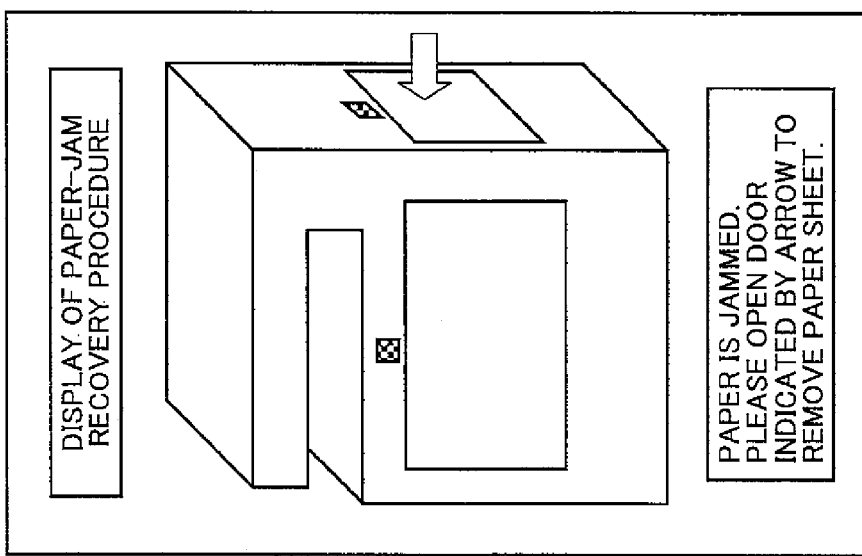

FIGS. 12A to 12C depict the case that the procedure display information is created with moving image date when the state is "01 (jamming)", and after shooting the description tool A (FIG. 7A) at the time of jamming, the paper-jam (jamming) recovery procedure is displayed on the displaying means of the portable telephone as a moving image in the order of FIGS. 12A, 12B, and 12C.

FIGS. 13A to 13C depict the case that the procedure display information is created with moving image date when the state is "02 (toner shortage)". After shooting the description tool A (FIG. 7A) at the time of black-toner shortage, the toner supply processing procedure is displayed on the displaying means of the portable telephone as a moving image in the order of FIGS. 13A, 13B, and 13C.

Figure 14A:
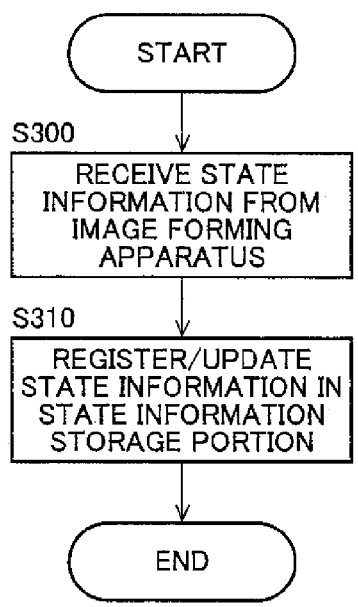
FIGS. 14A and 14B are flowcharts of a processing procedure of the information distributing server of the first embodiment.
Figure 14B:
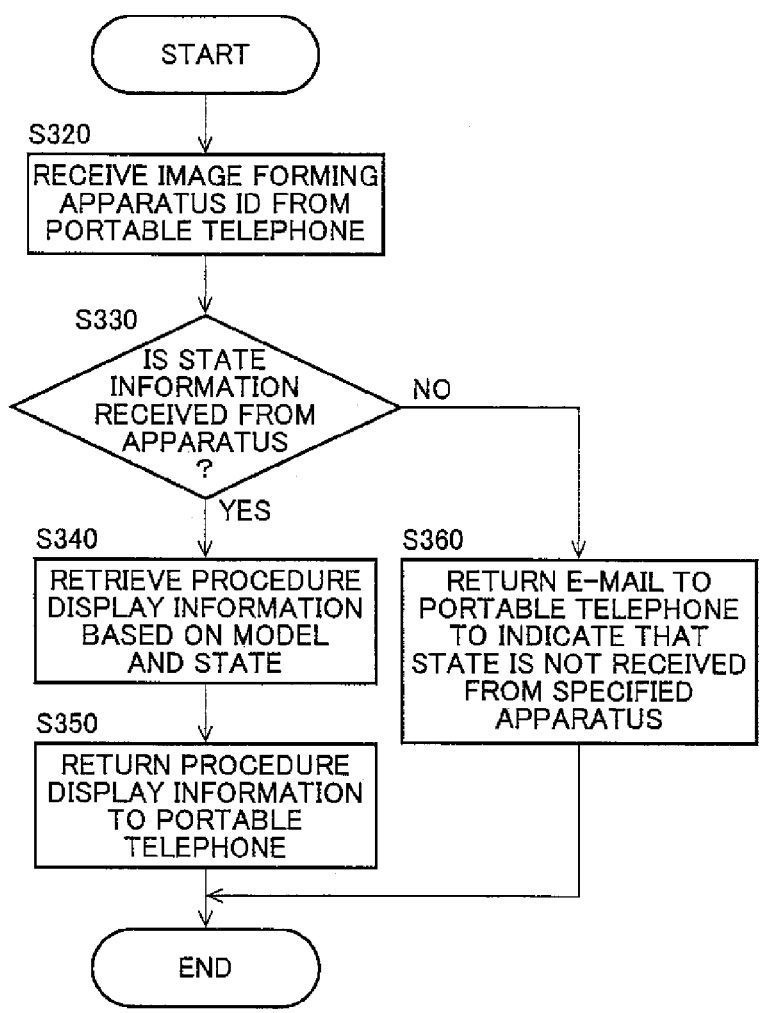

The processing procedure of the information distributing server 200 will then be described with reference to flowcharts of FIGS. 14A and 14B.

From any one of the image forming apparatuses 100, the state information receiving portion 210 receives the apparatus ID and the state information of the image forming apparatus 100 through the network (step S300).

The state information registering portion 220 correlates and registers the apparatus ID and the state information delivered from the state information receiving portion 210, by putting correspondence with each other, in the state information storage portion 230 (step S310) and waits until the next state information is sent from the image forming apparatuses 100.

If the same apparatus ID has already been registered, the state information registering portion 220 additionally registers only the state information not registered.

If the received state information includes a code indicating recovery to the normal state, the same information as the received information is deleted from the state information corresponding to the apparatus ID. If the state information corresponding to the apparatus ID completely runs out, the registration of the apparatus ID is erased from the state information storage portion 230.

The operation procedure request receiving portion 240 receives an operation procedure request (the image forming apparatus ID and the portable telephone ID) from any one of the portable telephones 300 through the network (step S320).

The determining portion 250, on referring to the state information storage portion 230, determines whether the same apparatus ID as the delivered apparatus ID exists, and if the same apparatus ID exists (step S330/YES), the retrieving portion 260 refers to the procedure display information storage portion 270 based on the model information of the apparatus ID, the state information corresponding to the apparatus ID, and the portable terminal ID and retrieves the procedure display information corresponding to the delivered model information and state information (step S340).

The procedure display information transmitting portion 280 attaches all the pieces of the retrieved procedure display information to an e-mail and transmits the e-mail to the portable terminal ID (step S350).

On the other hand, if the state information has not been received from the image forming apparatus of the apparatus ID received from the portable telephone 300 (step S330/NO), an e-mail is transmitted to the portable terminal ID that indicates "on situation requiring operations occurs in the specified image forming apparatus" (step S360).

<First Variation>

In the first embodiment, the image forming apparatus 100 transmits the entire state information to the information distributing server 200, if the detecting portion 106 detects the state requiring the operator's operation (such as jamming and toner shortage).

However, if the monitoring is performed in this way, an amount of communication through the network becomes too large.

Therefore, in a first variation, only when the operation procedure request is given from the operator to the information distributing server 200, the information distributing server 200 inquires the state of the image forming apparatus 100. This enables the communication traffic to be reduced between the image forming apparatus 100 and the information distributing server 200.

The functional configurations included in the information distributing server 200, the image forming apparatus 100, and the portable telephone 300 according to the first variation of the present invention will be described with reference to a block diagram of FIG. 15.

Figure 15:
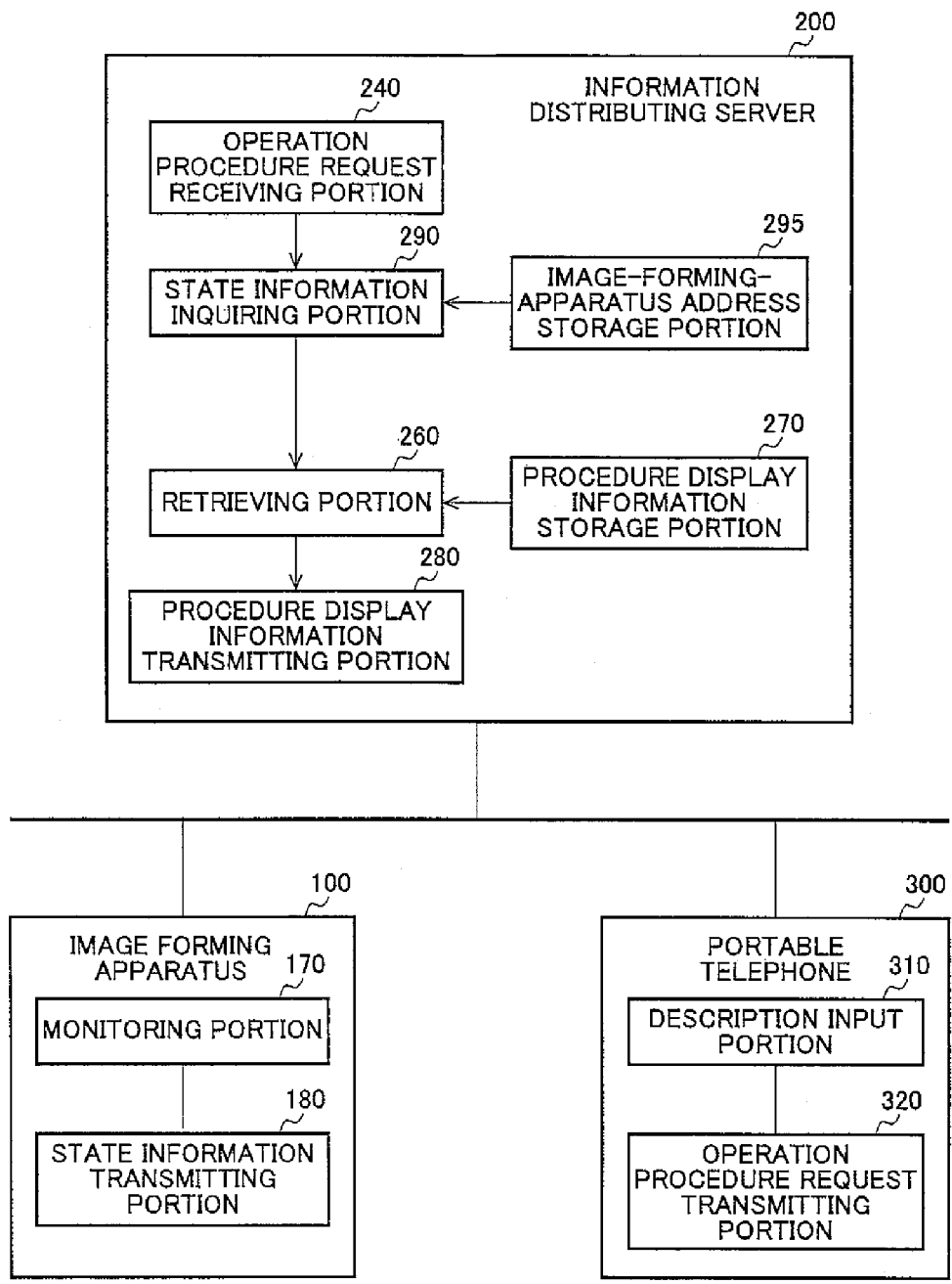
FIG. 15 is a block diagram of functional configurations included in an information distributing server, an image forming apparatus, and a portable telephone of a display system according to a first variation of the present invention.

In FIG. 15, the same reference numerals are added to the same functions as FIG. 4 and only the different functions will be described.

In the image forming apparatus 100, only the function of the monitoring portion 170 is different as follows.

The monitoring portion 170 is interrupted by the state information request from the information distributing server 200, activates the detecting portion 106 to acquire the state information of the apparatus 100, and performs the interruption processing to the state information transmitting portion 180 to deliver the acquired state information of the apparatus 100. In the first variation, the state of the apparatus 100 is not monitored at regular time intervals and a change in the state is not monitored unlike the first embodiment.

The information distributing server 200 includes the operation procedure request receiving portion 240, a state information inquiring portion 290, an image-forming-apparatus address storage portion 295, the retrieving portion 260, the procedure display information storage portion 270, and the procedure display information transmitting portion 280.

When receiving an operation procedure request from any one of the portable telephones 300 through the network, the operation procedure request receiving portion 240 activates the state information inquiring portion 290 to deliver thereto the received portable telephone ID and the apparatus ID of the image forming apparatus 100.

The state information inquiring portion 290, on referring to the image-forming-apparatus address storage portion 295, acquires an address corresponding to the delivered apparatus ID of the image forming apparatus 100 and makes a request to the address for transmitting the apparatus state information, and when the state information is returned, the state information inquiring portion 290 activates the retrieving portion 260 and delivers the state information, the portable terminal ID, and the model information of the apparatus ID thereto.

When the image forming apparatus 100 is registered in the display system, the network address thereof is preliminarily stored by corresponding to the image forming apparatus ID (such as a serial number and model information) in the image-forming-apparatus address storage portion 295.

Figure 16:
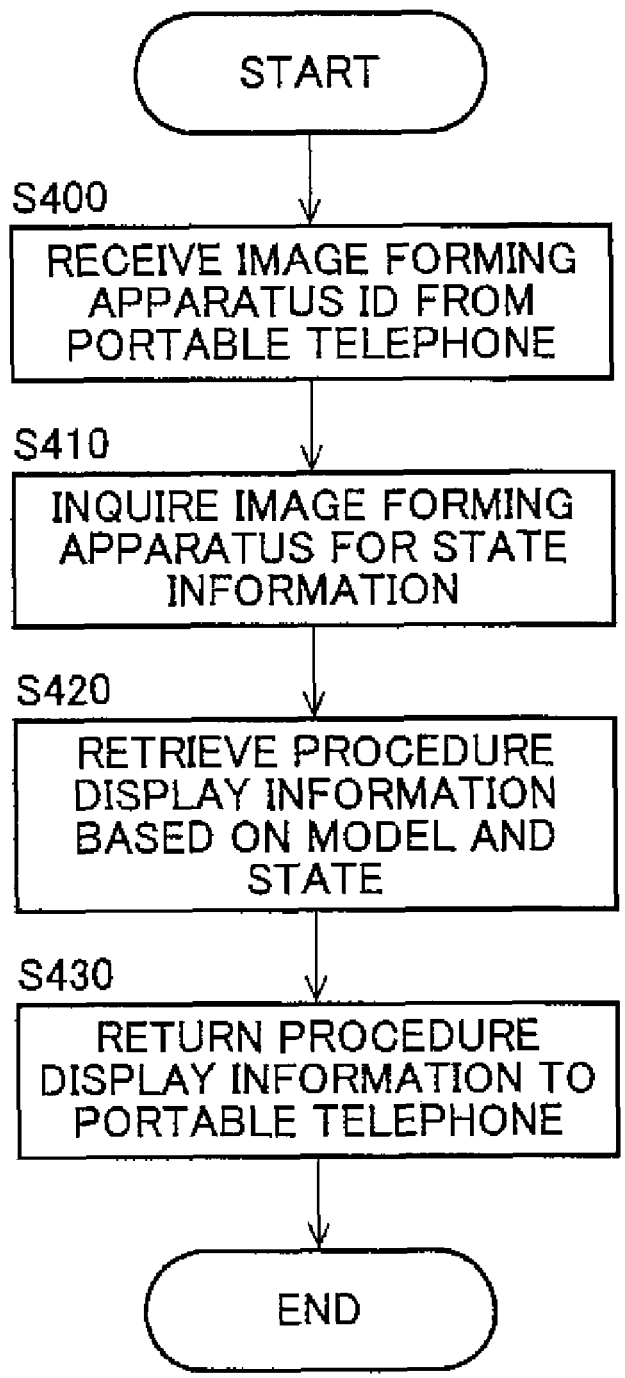
FIG. 16 is a flowchart of a processing procedure of the information distributing server of the first variation.

The processing procedure of the information distributing server 200 will then be described with reference to a flowchart of FIG. 16.

The operation procedure request receiving portion 240 receives an operation procedure request from any one of the portable telephones 300 through the network (step S400).

The state information inquiring portion 290, on referring to the image-forming-apparatus address storage portion 295, acquires an address corresponding to the received apparatus ID of the image forming apparatus 100 and makes a request to the address for transmitting the apparatus state information (step S410).

Based on the model information of the received apparatus ID, all the pieces of the state information responded to the inquiry, and the portable terminal ID, the retrieving portion 260, on referring to the procedure display information storage portion 270, retrieves the procedure display information corresponding to the delivered model information and state information (step S420).

The procedure display information transmitting portion 280 attaches all the pieces of the retrieved procedure display information to an e-mail and transmits the e-mail to the portable terminal ID (step S430).

As described above, when the image forming apparatus ID is transferred from the portable telephone to the information distributing server, since the image forming apparatus is identified using this image forming apparatus ID and the state of the apparatus is taken from this image forming apparatus, the communication traffic between the image forming apparatus 100 and the information distributing server 200 can be reduced.

Second Embodiment

In the second embodiment, the procedure display information (still image or moving image data) corresponding to the position of the operator is acquired and displayed. Since the configuration of the second embodiment is the same as that of the first embodiment, only the differences will be described.

An operating-portion code (operating-portion information) indicating an operation position is included as the image forming apparatus ID in addition to the serial number and the model information in the description tool (bar-code (such as two-dimensional bar-code, QR code, etc.)) affixed to the image forming apparatus.

Therefore, the description input portion 310 of the portable telephone 300 converts the image formed by shooting the description tool into the serial number, the model information, and the operating-portion code, which are used as the image forming apparatus ID, and transmits the image forming apparatus ID and the portable terminal ID of the portable telephone from the operation procedure request transmitting portion 320 to the information distributing server 200.

The procedure display information storage portion 270 of the information distributing server 200 stores the procedure display information (still image or moving image data) having correspondence to the combinations of the model information, the states, and the operating-portion codes as exemplarily illustrated in FIG. 17.

In the example of FIG. 17, a plurality of doors exists for accessing the inside of the image forming apparatus; the description tools indicating different operating-portion codes are affixed to the respective doors; and the operation procedure corresponding to a door to which an operator pays attention can be displayed when the operator shots the description tool affixed to the door.

In the example of the model 1 and the model 2 shown in FIG. 17, the model 1 is a relatively small sized model and the model 2 is a large sized model.

For the model 1, if the state is "01 (jamming)" and the operation position is the "front door", the procedure display information is registered as the moving image data shown in FIGS. 12A to 12C. In this case, after shooting the description tool A (FIG. 7A) at the time of jamming, the paper-jam (jamming) recovery procedure is displayed on the displaying means of the portable telephone as the moving image in the order of FIGS. 12A, 12B, and 12C.

Figure 18C:
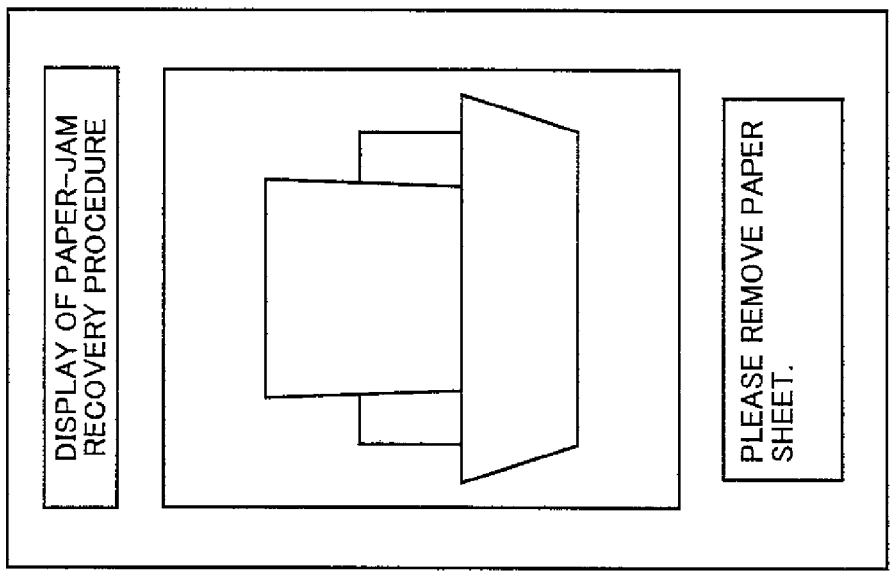
FIGS. 18A to 18C depict a display example of a paper-jam (jam) recovery procedure (moving image)
Figure 18B:
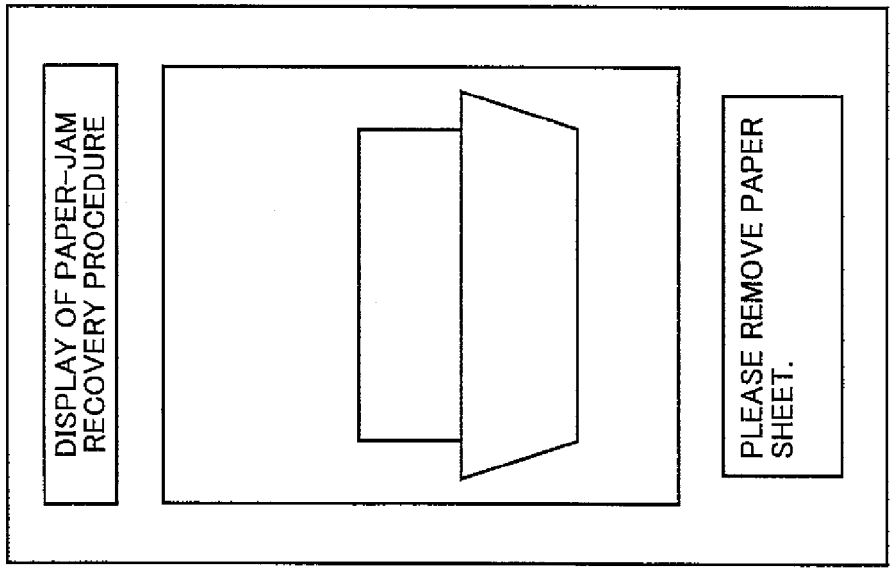
Figure 18A:
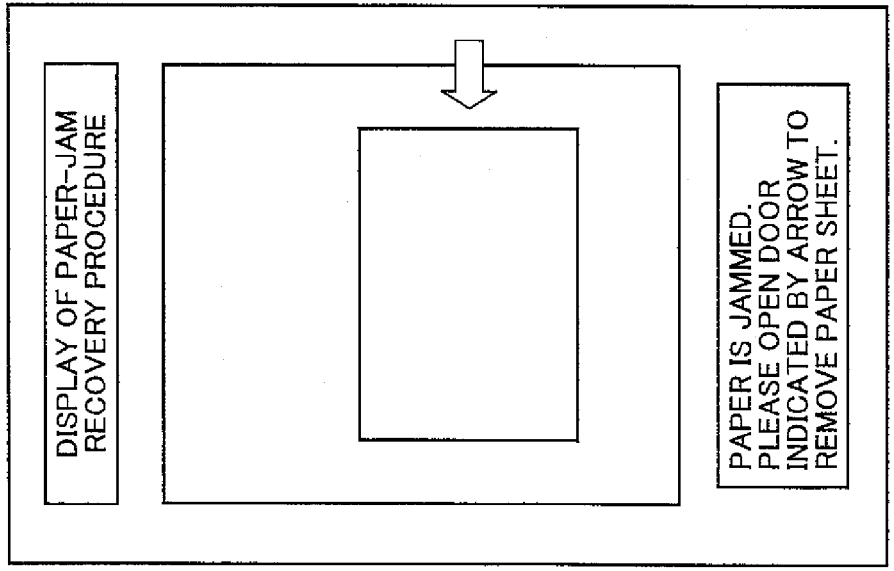

If the state is "01 (jamming)" and the operation position is the "side door", the procedure display information is registered as the moving image data shown in FIGS. 18A to 18C. In this case, after shooting the description tool B (FIG. 7B) at the time of jamming, the paper-jam (jamming) recovery procedure is displayed on the displaying means of the portable telephone as the moving image in the order of FIGS. 18A, 18B, and 18C.

If the state is "02 (toner shortage)" and the operation position is the "front door", the procedure display information is registered as the moving image data shown in FIGS. 13A to 13C. In this case, after shooting the description tool A (FIG. 7A) at the time of black-toner shortage, the toner supply processing procedure is displayed on the displaying means of the portable telephone as the moving image in the order of FIGS. 13A, 13B, and 13C.

If the state is "02 (toner shortage)" and the operation position is the "side door", the procedure display information is registered as the moving image data shown in FIGS. 19A to 19C. In this case, after shooting the description tool B (FIG. 7B) at the time of black-toner shortage, the toner supply processing procedure is displayed on the displaying means of the portable telephone as the moving image in the order of FIGS. 19A, 19B, and 19C.

Since the model 2 is a large sized model, the jamming cancellation operation must be performed from the side face and the toner replacement must be performed from the front face. Therefore, if the state is "01 (jamming)" and the operation position is the "front door", the procedure display information is registered as the still image data shown in FIG. 11. In this case, after shooting the description tool A (FIG. 7A) at the time of jamming, the paper-jam (jamming) recovery procedure is displayed on the displaying means of the portable telephone as the still image of FIG. 11.

If the state is "01 (jamming)" and the operation position is the "front door", the procedure display information is registered as the moving image data shown in FIGS. 18A to 18C. In this case, after shooting the description tool B (FIG. 7B) at the time of jamming, the paper-jam (jamming) recovery procedure is displayed on the displaying means of the portable telephone as the moving image in the order of FIGS. 18A, 18B, and 18C.

If the state is "02 (toner shortage)" and the operation position is the "front door", the procedure display information is registered as the moving image data shown in FIGS. 13A to 13C. In this case, after shooting the description tool A (FIG. 7A) at the time of black-toner shortage, the toner supply process procedure is displayed on the displaying means of the portable telephone as the moving image in the order of FIGS. 13A, 13B, and 13C.

Figure 20:
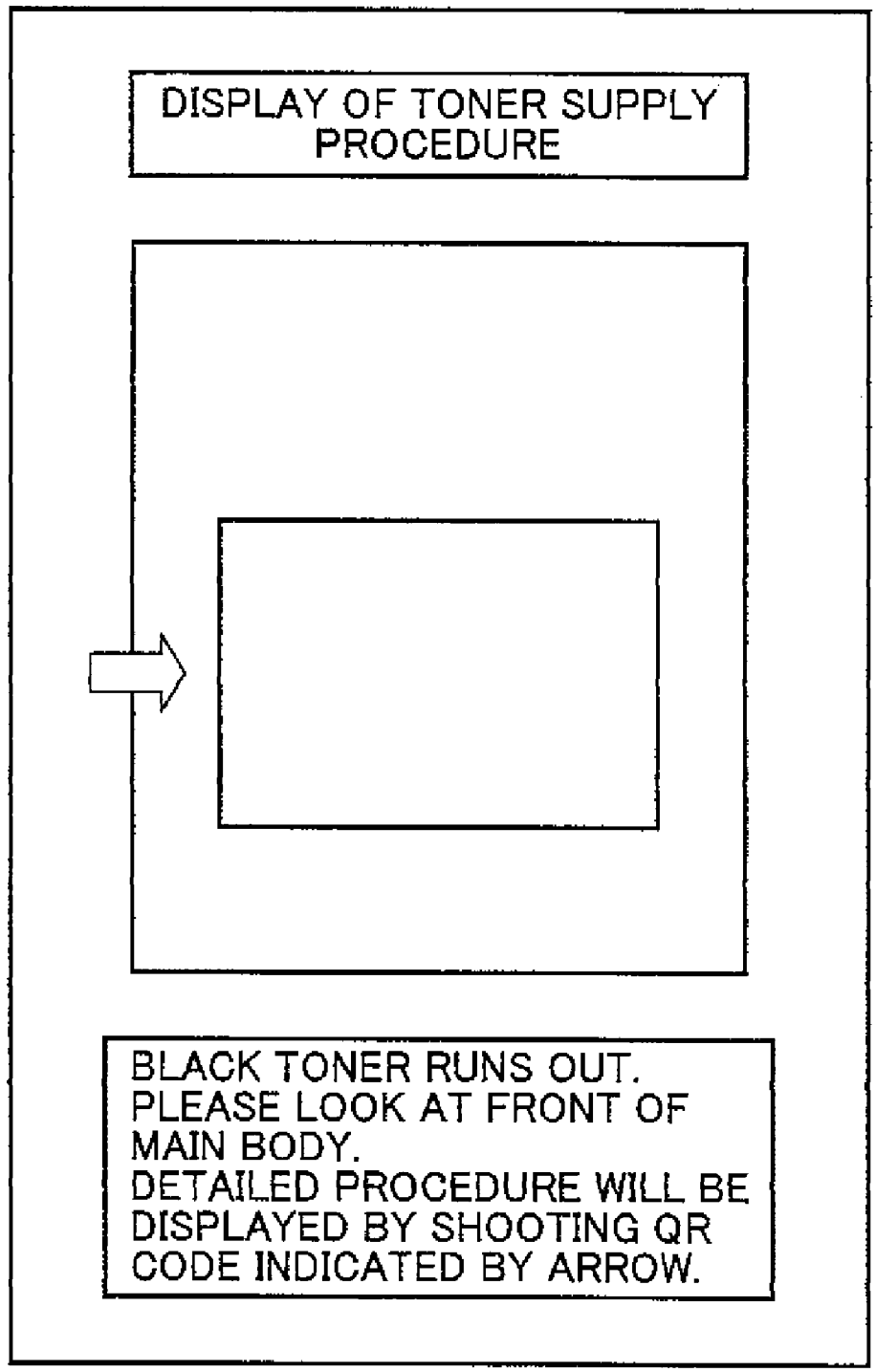
FIG. 20 depicts a display example of the toner supply procedure (still image)

If the state is "02 (toner shortage)" and the operation position is the "side door", the procedure display information is registered as the still image data shown in FIG. 20. In this case, since the toner replacement must be performed on the front side of the apparatus, when shooting the description tool B (FIG. 7B) at the time of the black "toner shortage", the procedure display image is displayed on the displaying means of the portable telephone to "prompt an operator to go around to the front side of the main body and look at the front door". When the operator goes around to the front side and shots the description tool A (FIG. 7A), the displaying means of the portable telephone displays the moving image of FIGS. 13A to 13C to show the toner supply processing procedure.

The information distributing server 200 extracts from the procedure display information storage portion 270 the procedure display information agrees with the apparatus state information transmitted from the image forming apparatuses 100 and the image forming apparatus ID (the serial number, the model information, and the operating-portion code indicating the position of the operator) sent from the portable telephone 300 and transmits this procedure display information to the portable terminal ID.

In this way, different operating methods can be displayed in accordance with the operation position (the operating portion) where the operator exists and more detailed procedure can be displayed.

For example, it is assumed that the state information is "jamming" in the image forming apparatus with the model information of the "model 1" and that the operator shots the description tool affixed to the "front door" of the apparatus.

The information distributing server 200 extracts four pieces of the procedure display information with respect to the "model 1" of FIG. 17 based on the model information indicating the "model 1". Two pieces of the procedure display information corresponding to the procedure of canceling the jamming are then extracted from the state information (jamming) The procedure display information of the "jamming display 2" is identified from the operating-portion code (front door) included in the image forming apparatus ID and the procedure display information is transmitted to the portable telephone.

Third Embodiment

The electronic device has expendable supplies or replacement parts that are replaced at predetermined time intervals inside the device. For example, in the case of the image forming apparatus, these are the toner case 131, the fixing unit 7, the exposure unit 1, the developing devices 2, the photosensitive drums 3, the cleaner units 4, the electrifiers 5, the intermediate transfer belt unit 6, etc. In some cases, procedures for replacing these expendable supplies are not known and the operation procedures thereof are desired to be displayed.

In a third embodiment, description tools 132 (second electronic device information) are affixed to the internal parts such as expendable supplies, for example, the fixing unit 7 and the toner case 131 of FIG. 1. On the description tools 132, the model information of the image forming apparatus to which the internal parts can be equipped and represented by bar-codes (two-dimensional bar-code, QR code, etc.) is printed in the form of bar-codes.

The necessary procedure display information is acquired by shooting the description tool affixed to the image forming apparatus and the description tool affixed to the internal part to be replaced and sending to the information distributing server 200 the image forming apparatus ID and the second electronic device information converted from the respective description tools.

Since the configuration of the third embodiment is the same as that of the first embodiment, only the differences will be described.

Differences in the portable telephone 300 will first be described.

The description input portion 310 inputs the description tool (e.g., a bar-code (two-dimensional bar-code, QR code), etc.) affixed to the image forming apparatuses 100 through the input portion (camera) 302 and converts it into the apparatus ID (model, serial number) represented by the description tool, and further inputs the description tool affixed to the internal part to be replaced through the input portion (camera) 302 and converts it into the second electronic device information (model information of available image forming apparatuses) represented by the description tool, and activates the operation procedure request transmitting portion 320 to deliver the converted apparatus ID and the second electronic device information.

The operation procedure request transmitting portion 320 acquires a portable telephone ID (e.g., e-mail address of portable telephone) specifying the portable telephone stored in the ROM, etc., and transmits it to the address of the information distributing server 200 stored in the ROM, etc., through the communicating portion 304 along with the apparatus ID and the second electronic device information delivered from the description input portion 310.

Figure 21:
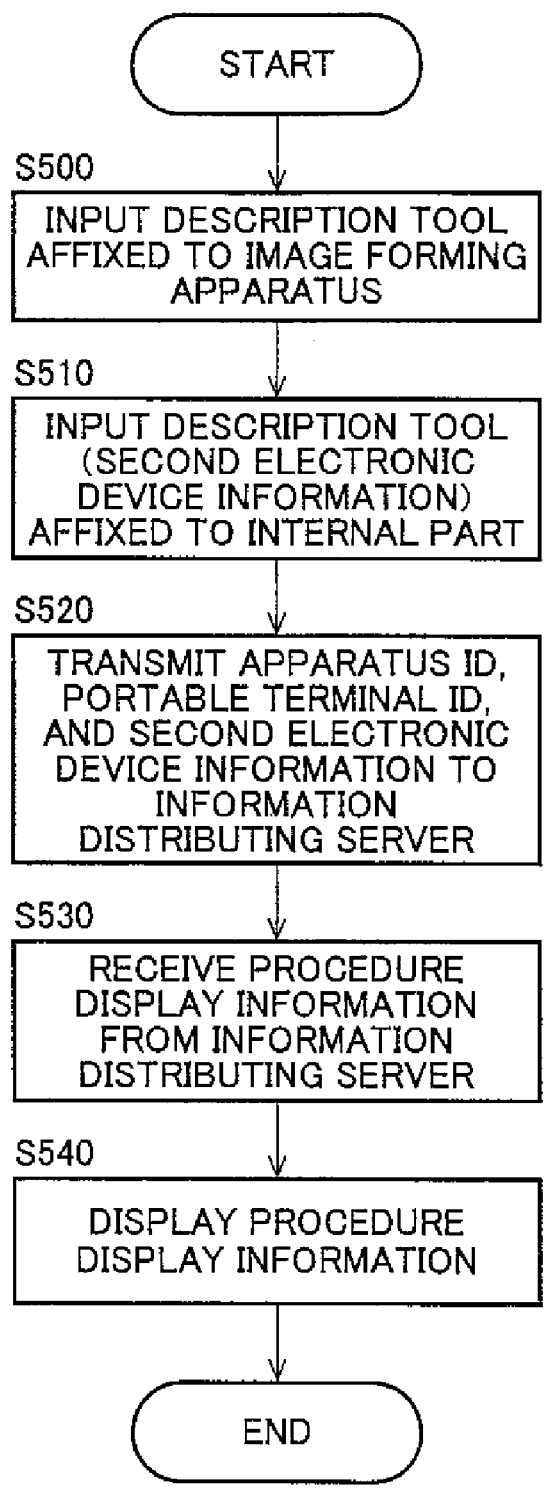
FIG. 21 is a flowchart of a processing procedure of the portable telephone of a third embodiment.

The processing procedure of the portable telephone 300 will then be described with reference to a flowchart of FIG. 21.

At the time of replacing the internal part of the image forming apparatus, when an operator shoots the description tool (image forming apparatus ID) affixed to the image forming apparatus having the internal part to be replaced using the input portion (camera) of the portable telephone 300, the description input portion 310 converts the image of the shot description tool into the apparatus ID represented by the description tool (step S500), and the operator further shoots the description tool affixed to the internal part desired to be replaced using the input portion (camera), and the image of the shot description tool is converted into the second electronic device information represented by the description tool (step S510).

The operation procedure request transmitting portion 320 of the portable telephone 300 acquires the portable terminal ID (e.g., e-mail address of the portable telephone) specifying the portable telephone and transmits it to the information distributing server 200 along with the apparatus ID and the second electronic device information converted by the description input portion 310 (step S520).

The operator acquires the procedure display information by receiving the e-mail sent from the information distributing server 200 (step S530) and performs a predetermined operation to the portable telephone to display the procedure display information (moving image or still image data) of the requested operation procedure on the displaying means of the operation panel (step S540).

The monitoring portion 170 of the image forming apparatus 100 monitors whether a predetermined period has elapsed after an internal part such as expendable supplies is newly set or replaced, and if a predetermined period has elapsed, the state information transmitting portion 180 transmits to the information distributing server 200 the state information indicating a predetermined-period elapse error.

Differences in the information distributing server 200 will then be described.

When receiving an operation procedure request from any one of the portable telephones 300 through the network, the operation procedure request receiving portion 240 activates the determining portion 250 to deliver thereto the received portable telephone ID, the apparatus ID of the image forming apparatus 100, and the second electronic device information.

The determining portion 250, on referring to the state information storage portion 230, searches for the same apparatus ID as the delivered apparatus ID. If the same apparatus ID exists, it is determined whether the model information of the apparatus ID is included in the model information of the delivered second electronic device information.

If the model information of the apparatus ID is not included in the model information of the second electronic device information, an e-mail is transmitted to the portable terminal ID that indicates "this is not an internal part that can be mounted on the image forming apparatus".

If the model information of the apparatus ID is included in the model information of the second electronic device information, the retrieving portion 260 is activated, and the model information of the delivered apparatus ID, the state information corresponding to the apparatus ID, and the portable terminal ID are delivered thereto.

If the same apparatus ID is not registered in the state information storage portion 230, an e-mail is transmitted to the portable terminal ID that indicates "no situation requiring operations occurs in the specified image forming apparatus".

Figure 22:
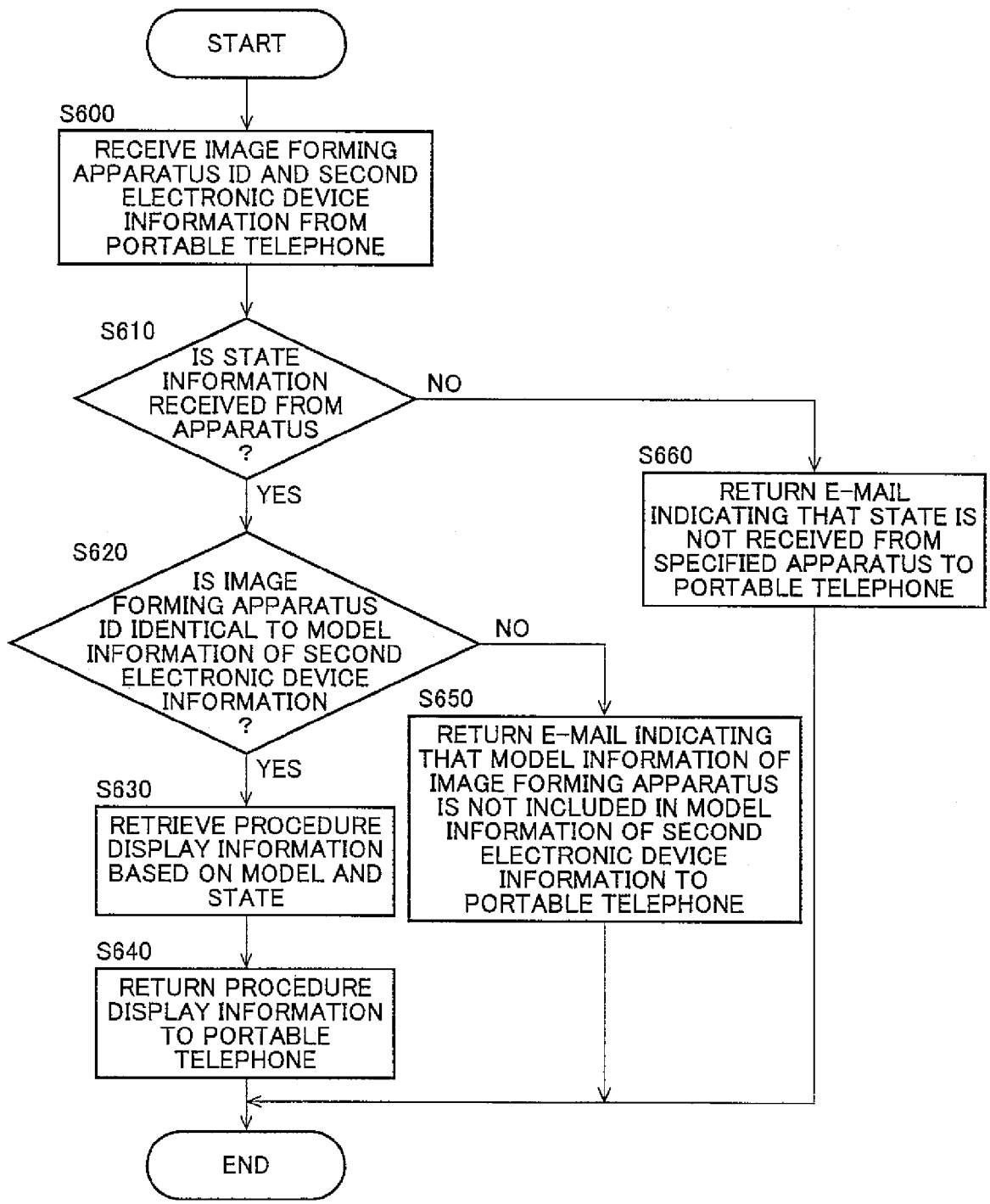
FIG. 22 is a flowchart of a processing procedure of the information distributing server of the third embodiment.

The processing procedure of the information distributing server 200 will then be described with reference to a flowchart of FIG. 22.

The operation procedure request receiving portion 240 receives the operation procedure request (the portable terminal ID, the image forming apparatus ID, and the second electronic device information) through the network from any one of the portable telephones 300 (step S600).

The determining portion 250, on referring to the state information storage portion 230, determines whether the same apparatus ID as the received apparatus ID exists, and if the same apparatus ID exists (step S610/YES), it is further determined whether the model information of the apparatus ID is included in the model information of the second electronic device information (step S620).

If the model information of the apparatus ID is included in the model information of the second electronic device information (step S620/YES), the retrieving portion 260, on referring to the procedure display information storage portion 270, retrieves the procedure display information corresponding to the delivered model information and state information based on the model information of the delivered apparatus ID, the state information corresponding to the apparatus ID, and the portable terminal ID (step S630).

The procedure display information transmitting portion 280 attaches all the pieces of the retrieved procedure display information to an e-mail and transmits the e-mail to the portable terminal ID (step S640).

On the other hand, if the model information of the apparatus ID is not included in the model information of the second electronic device information (step S620/NO), an e-mail is transmitted to the portable terminal ID that indicates "this is not an internal part that can be mounted on the image forming apparatus" (step S650).

If the state information is not received from the image forming apparatus of the apparatus ID received from the portable telephone 300 (step S610/NO), an e-mail is transmitted to the portable terminal ID that indicates "no situation requiring operations occurs in the specified image forming apparatus" (step S660).

The present invention is not limited to the above embodiments and of course various variations and modifications can be applied within a range not departing from the scope of the present invention.

For example, the present invention is also implemented by creating computer programs of the functions of the means, i.e., the information distributing server (information distributing apparatus), the electronic device (image forming apparatus), and the portable telephone (portable terminal) and by installing and executing the computer programs in the information distributing server (information distributing apparatus), the electronic device (image forming apparatus), and the portable telephone (portable terminal), respectively. The present invention can easily be implemented by recording the computer programs in a removable recording medium or downloading the computer programs through the network.

According to the present invention, since the suitable procedure display can be performed on the portable terminal for a plurality of electronic devices in accordance with respective operation statuses, one can rapidly perform cancellation of errors, etc., and replacement of expendable supplies, etc.

The invention claimed is:

1. An operation information display system comprising:
an electronic device including an operation portion which detects an abnormal state of the electronic device and is operated for recovering from the abnormal state, the operation portion having identifier information attached thereto for identifying device information of the electronic device and the operation portion;
a portable terminal which obtains the identifier information of the electronic device attached to the operation portion of the electronic device and transmits the identifier information to information distributing apparatus, then displays an operation procedure guide returned from the information distributing apparatus on a display device;
the information distributing apparatus which
stores the operation procedure guide indicating an operation instruction which instructs an operation procedure for each operation portion to recover from various abnormal states and an operation portion to be operated next time for each model of the electronic device,
registers occurrence of the abnormal state when detection of the abnormal state is received from the electronic device, and deletes the registered abnormal state when detection of recovery from the abnormal state is received, and
extracts, when the identifier information of the electronic device is received from the portable terminal, the operation procedure guide corresponding to the operation portion for recovering from the received abnormal state associated with the device information and returns the extracted procedure to the portable terminal; wherein
when the information distributing apparatus extracts the operation procedure guide corresponding to the identifier information of the electronic device received from the portable terminal and returns it to the portable terminal,
in the case where the operation portion indicated by the received identifier information is an operation portion to be operated with a predetermined procedure, the information distributing apparatus transmits the operation procedure guide indicating the operation instruction of the predetermined procedure and an operation portion to be operated next time,
in the case of an operation portion other than the indicated operation portion, transmits a guide for prompting transmission of identifier information indicating an operation portion to be operated with the predetermined procedure,
the portable terminal transmits the identifier information to the information distributing apparatus so that the information distributing apparatus can return a predetermined operation procedure guide to receive it, and then the portable terminal successively repeats transmission of the identifier information indicating the operation portion to be operated next and reception of the operation procedure guide based on the returned and displayed operation procedure guide.

* * * * *